(12) United States Patent
Teyeb

(10) Patent No.: US 11,425,599 B2
(45) Date of Patent: Aug. 23, 2022

(54) PREVENTING/MITIGATING PACKET LOSS IN INTEGRATED ACCESS BACKHAUL (IAB) NETWORKS

(71) Applicant: Telefonaktiebolaget LM Ericsson (publ), Stockholm (SE)

(72) Inventor: Oumer Teyeb, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/252,118

(22) PCT Filed: Jun. 19, 2019

(86) PCT No.: PCT/SE2019/050590
§ 371 (c)(1),
(2) Date: Dec. 14, 2020

(87) PCT Pub. No.: WO2019/245442
PCT Pub. Date: Dec. 26, 2019

(65) Prior Publication Data
US 2021/0274381 A1 Sep. 2, 2021

Related U.S. Application Data

(60) Provisional application No. 62/688,231, filed on Jun. 21, 2018.

(51) Int. Cl.
*H04W 28/04* (2009.01)
*H04L 1/18* (2006.01)
(Continued)

(52) U.S. Cl.
CPC .......... *H04W 28/04* (2013.01); *H04L 1/1896* (2013.01); *H04W 80/02* (2013.01); *H04W 88/14* (2013.01)

(58) Field of Classification Search
CPC ..... H04W 28/04; H04W 80/02; H04W 88/14; H04L 1/1896; H04L 1/1685
See application file for complete search history.

(56) References Cited

U.S. PATENT DOCUMENTS

2009/0040982 A1* 2/2009 Ho .................. H04L 1/1896
370/331
2009/0323770 A1* 12/2009 Venkatachalam ....... H04L 1/188
375/133
(Continued)

FOREIGN PATENT DOCUMENTS

EP         2469750 A1    6/2012
WO    2009046041 A2    4/2009

OTHER PUBLICATIONS

International Search Report and Written Opinion dated Sep. 18, 2019 for International Application No. PCT/SE2019/050590 filed on Jun. 19, 2019, consisting of 9-pages.
(Continued)

*Primary Examiner* — Fahmida S Chowdhury
(74) *Attorney, Agent, or Firm* — Christopher & Weisberg, P.A.

(57) ABSTRACT

A method is performed by a base station centralized unit (CU) node that is in communication, using a packet data convergence protocol (PDCP), with a user equipment (UE) via one or more intermediate integrated access backhaul (IAB) nodes of a radio access network (RAN). The CU node receives one or more PDCP packets over a radio link control (RLC) layer utilizing hop-by-hop automatic repeat request (ARQ) at each intermediate IAB node. In response to a trigger, the CU node sends an uplink (UL) data delivery status report to at least one of the intermediate IAB nodes.

14 Claims, 23 Drawing Sheets

(51) Int. Cl.
H04W 80/02 (2009.01)
H04W 88/14 (2009.01)

(56) References Cited

U.S. PATENT DOCUMENTS

| | | | |
|---|---|---|---|
| 2012/0140704 A1* | 6/2012 | Zhao | H04L 1/1874 370/315 |
| 2017/0245172 A1* | 8/2017 | Yoon | H04W 88/08 |
| 2017/0374612 A1* | 12/2017 | Stojanovski | H04W 60/04 |
| 2018/0241509 A1* | 8/2018 | Phuyal | H04L 1/1614 |
| 2019/0372887 A1* | 12/2019 | Majmundar | H04L 47/34 |
| 2021/0021504 A1* | 1/2021 | Balasu | H04W 24/10 |
| 2021/0099930 A1* | 4/2021 | Yao | H04W 76/23 |

OTHER PUBLICATIONS

3GPP TR 38.874 V0.2.1 3rd Generation Partnership Project; Technical Specification Group Radio Access Network; Study on Integrated Access and Backhaul; (Release 15); May 2018,Valbonne, France, consisting of 19-pages.

* cited by examiner

PREVENTING/MITIGATING PACKET LOSS IN INTEGRATED ACCESS BACKHAUL (IAB) NETWORKS

TECHNICAL FIELD

This relates to mobile communications networks, and in particular to preventing or mitigating packet loss in Integrated Access Backhaul systems.

BACKGROUND

A mobile communication system supports Integrated Access Backhaul technology, in particular allowing a multi-hop path between a UE device and a "donor" node. In such a situation, there is a possibility that one link in the multi-hop path will fail. In some cases, the path will be switched.

In such situations, as discussed in more detail below, there is a danger that packets will be lost.

SUMMARY

According to a first aspect, there is provided a method performed by a base station centralized unit (CU) node in communication, using a packet data convergence protocol (PDCP), with a user equipment (UE) via one or more intermediate integrated access backhaul (IAB) nodes of a radio access network (RAN). The method comprises: receiving one or more PDCP packets over a radio link control (RLC) layer utilizing hop-by-hop automatic repeat request (ARQ) at each intermediate IAB node; and, in response to a trigger, sending, to at least one of the intermediate IAB nodes, an uplink (UL) data delivery status report.

The trigger may comprise detecting that one or more further PDCP packets, that were expected to be received with the plurality of PDCP packets, are missing; and the uplink (UL) data delivery status report may indicates the one or more further PDCP packets detected as missing.

The trigger may comprise detecting that the number of missing PDCP packets, including the one or more further PDCP packets, exceeds a predetermined threshold.

The UL data delivery status report may comprise a flag instructing the IAB node to retransmit the further PDCP packets that are indicated as missing.

The trigger may comprise detecting a path change involving at least one of the intermediate IAB nodes.

The trigger may comprise receiving a message from an IAB node.

The trigger may comprise receiving a predetermined amount of data.

The method may comprise sending UL data delivery status reports periodically.

The method may further comprise configuring the UE to delay declaration of a radio link failure (RLF) when connected to the RAN via one or more intermediate IAB nodes, relative to when connected to the RAN without intermediate IAB nodes.

The amount of delay may be configured to be proportional to the number of intermediate IAB nodes.

According to a second aspect, there is provided a method performed by an integrated access backhaul (IAB) node of a radio access network (RAN), the IAB node configured as an intermediate in communication), via a packet data convergence protocol (PDCP), between a base station centralized unit (CU) node and a user equipment (UE). The method comprises: receiving one or more PDCP packets over a radio link control (RLC) layer utilizing hop-by-hop automatic repeat request (ARQ), wherein the PDCP packets are received from an RLC peer entity; transmitting, to the CU node, the one or more PDCP packets over a further RLC layer utilizing hop-by-hop ARQ; and receiving, from the CU node, an uplink (UL) data delivery status report.

The UL data delivery status report may comprise an indication that the CU node detected one or more of the PDCP packets as missing.

The UL data delivery status report may comprise an indication to retransmit the indicated missing PDCP packets according to one or more criteria.

The method may further comprise sending a path change notification to the CU node.

The method may further comprise sending RLC acknowledgements, to the RLC peer entity, corresponding to all PDCP packets indicated as not missing by the UL data delivery status report.

The method may further comprise refraining from sending RLC acknowledgements to the RLC peer entity until a further UL data delivery status report from the CU node indicates that further PDCP packets, corresponding to the detected missing PDCP packets, have been received properly at the CU node.

The method may further comprise polling the CU node to send the UL data delivery status report.

According to a third aspect, there is provided a base station centralized unit (CU) node configurable for operation in a radio access network (RAN) that also comprises one or more integrated access backhaul (IAB) nodes. The CU node comprises: processing circuitry configured to perform operations corresponding to any of the methods of the first aspect; and power supply circuitry configured to supply power to the CU node.

According to a fourth aspect, there is provided an integrated access backhaul (IAB) node configurable for operation in a radio access network (RAN) that also comprises a base station centralized unit (CU) node. The IAB node comprises: processing circuitry configured to perform operations corresponding to any of the methods of the second aspect; and power supply circuitry configured to supply power to the IAB node.

Accordingly, exemplary embodiments of the present disclosure address these and other difficulties in configuration and/or management of a 5G network comprising IAB nodes, thereby enabling the otherwise-advantageous deployment of IAB solutions. Such exemplary embodiments can include methods and/or procedures performed by a base station centralized unit (CU) node in communication, using a packet data convergence protocol (PDCP), with a user equipment (UE) via one or more intermediate integrated access backhaul (IAB) nodes of a radio access network (RAN). The exemplary method and/or procedure can include detecting that one or more further PDCP packets, that were expected to be received with the plurality of PDCP packets, are missing. The exemplary method and/or procedure can also include establishing a secure connection with the RAN. The exemplary method and/or procedure can further include sending, to at least one of the intermediate IAB nodes, an uplink (UL) data delivery status report indicating the one or more further PDCP packets detected as missing. In some embodiments, the exemplary method and/or or procedure can also include configuring the UE to delay declaration of a radio link failure (RLF) when connected to the RAN via one or more intermediate IAB nodes, relative to when connected to the RAN without intermediate IAB nodes.

Exemplary embodiments also include methods and/or procedures performed by an integrated access backhaul (IAB) node of a radio access network (RAN), the IAB node configured as an intermediate in communication, via a packet data convergence protocol (PDCP), between a base station centralized unit (CU) node and a user equipment (UE). The exemplary method and/or procedure can include receiving one or more PDCP packets over a radio link control (RLC) layer utilizing hop-by-hop automatic repeat request (ARQ), wherein the PDCP packets are received from an RLC peer entity. The exemplary method and/or procedure can also include transmitting, to the CU node, the one or more PDCP packets over a further RLC layer utilizing hop-by-hop ARQ. The exemplary method and/or procedure can also include receiving, from the CU node, an uplink (UL) data delivery status report comprising: a first indication that the CU node detected one or more of the PDCP packets as missing; and a second indication to retransmit the indicated missing PDCP packets according to one or more criteria.

In some embodiments, the exemplary method and/or procedure can also include sending a path change notification to the CU node. In some embodiments, the exemplary method and/or procedure can also include immediately retransmitting the indicated missing PDCP packets according to the second indication. In some embodiments, the exemplary method and/or procedure can also include polling the CU node to send the UL data delivery status report.

In some embodiments, the exemplary method and/or procedure can also include sending RLC acknowledgements, to the RLC peer entity, corresponding to all PDCP packets indicated as not missing by the UL data delivery status report. In other embodiments, the exemplary method and/or procedure can also include refraining from sending RLC acknowledgements to the RLC peer entity until a further UL data delivery status report from the CU node indicates that further PDCP packets, corresponding to the detected missing PDCP packets, have been received properly at the CU node.

Exemplary embodiments also include IAB nodes, CU nodes, and combinations thereof, configured to perform the operations of the above-described exemplary methods and/or procedures.

A number of exemplary embodiments are disclosed herein, as set out below.

1. A method performed by a base station centralized unit (CU) node in communication, using a packet data convergence protocol (PDCP), with a user equipment (UE) via one or more intermediate integrated access backhaul (IAB) nodes of a radio access network (RAN), the method comprising:
   receiving one or more PDCP packets over a radio link control (RLC) layer utilizing hop-by-hop automatic repeat request (ARQ) at each intermediate IAB node;
   detecting that one or more further PDCP packets, that were expected to be received with the plurality of PDCP packets, are missing; and
   sending, to at least one of the intermediate IAB nodes, an uplink (UL) data delivery status report indicating the one or more further PDCP packets detected as missing.
2. The method of embodiment 1, wherein the UL data delivery status report comprises a flag instructing the IAB node to retransmit the further PDCP packets that are indicated as missing.
3. The method of embodiment 2, wherein the flag further indicates that the IAB node should immediately retransmit the further PDCP packets that are indicated as missing.
4. The method of any of embodiments 1-3, further comprising: detecting a path change involving at least one of the intermediate IAB nodes; and sending the UL data delivery status report in response to detecting the path change.
5. The method of any of embodiments 1-2, wherein the timing of sending the UL data delivery status reports is periodic.
6. The method of embodiment 5, wherein the timing of sending the UL data delivery status report is independent of detecting that one or more further PDCP packets are missing.
7. The method of embodiments 1-2, wherein CU node sends the UL data delivery status report upon detecting that the number of missing PDCP packets, including the one or more further PDCP packets, exceeds a predetermined threshold.
8. The method of any of embodiments 1-7, further comprising, configuring the UE to delay declaration of a radio link failure (RLF) when connected to the RAN via one or more intermediate IAB nodes, relative to when connected to the RAN without intermediate IAB nodes.
9. The method of embodiment 8, wherein the amount of delay configured is proportional to the number of intermediate IAB nodes.
10. A method performed by an integrated access backhaul (IAB) node of a radio access network (RAN), the IAB node configured as an intermediate in communication), via a packet data convergence protocol (PDCP), between a base station centralized unit (CU) node and a user equipment (UE), the method comprising:
    Receiving one or more PDCP packets over a radio link control (RLC) layer utilizing hop-by-hop automatic repeat request (ARQ), wherein the PDCP packets are received from an RLC peer entity;
    transmitting, to the CU node, the one or more PDCP packets over a further RLC layer utilizing hop-by-hop ARQ;
    receiving, from the CU node, an uplink (UL) data delivery status report comprising:
      i. a first indication that the CU node detected one or more of the PDCP packets as missing; and
      ii. a second indication to retransmit the indicated missing PDCP packets according to one or more criteria.
11. The method of embodiment 10, further comprising sending a path change notification to the CU node.
12. The method of embodiments 10-11, further comprising immediately retransmitting the indicated missing PDCP packets according to the second indication.
13. The method of embodiments 10-12, further comprising sending RLC acknowledgements, to the RLC peer entity, corresponding to all PDCP packets indicated as not missing by the UL data delivery status report.
14. The method of embodiments 10-12, further comprising refraining from sending RLC acknowledgements to the RLC peer entity until a further UL data delivery status report from the CU node indicates that further PDCP packets, corresponding to the detected missing PDCP packets, have been received properly at the CU node.

15. The method of embodiment 10, further comprising polling the CU node to send the UL data delivery status report.
16. A base station centralized unit (CU) node configurable for operation in a radio access network (RAN) that also comprises one or more integrated access backhaul (IAB) nodes, the CU node comprising:
   processing circuitry configured to perform operations corresponding to any of the methods of embodiments 1-9; and
   power supply circuitry configured to supply power to the CU node.
17. An integrated access backhaul (IAB) node configurable for operation in a radio access network (RAN) that also comprises a base station centralized unit (CU) node, the IAB node comprising:
   processing circuitry configured to perform operations corresponding to any of the methods of embodiments 10-15; and
   power supply circuitry configured to supply power to the IAB node.
18. A communication system including a host computer comprising:
   processing circuitry configured to provide user data; and
   a communication interface configured to forward the user data to a cellular network for transmission to a user equipment (UE) through a core network (CN) and a radio access network (RAN);
   wherein:
   the RAN comprises an integrated access backhaul (IAB) node and a base station centralized unit (CU) node;
   the IAB node comprises a radio interface and processing circuitry configured for communication with the UE and with one or more other RAN nodes; and
   the IAB node radio interface and processing circuitry are further configured to perform operations corresponding to any of the methods of embodiments 10-15.
19. The communication system of embodiment 21, further comprising the UE configured to communicate with the IAB node.
20. The communication system of any of embodiments 18-19, wherein:
   the processing circuitry of the host computer is configured to execute a host application, thereby providing the user data; and
   the UE comprises processing circuitry configured to execute a client application associated with the host application.
21. The communication system of any of embodiments 21-24, wherein
   the CU node comprises a radio interface and processing circuitry configured for communication with the UE and with one or more other RAN nodes; and
   the CU node radio interface and processing circuitry are configurable to perform operations corresponding to any of the methods of embodiments 1-9.
22. A method implemented in a communication system including a host computer, a cellular network, and a user equipment (UE), the method comprising:
   at the host computer, providing user data;
   at the host computer, initiating a transmission carrying the user data to the UE via a cellular network comprising at least an integrated access backhaul (IAB) node; and
   operations, performed by the IAB node, corresponding to any of the methods of embodiments 10-15.
23. The method of embodiment 22, wherein the data message comprises the user data, and further comprising transmitting the user data by the access node.
24. The method of any of embodiments 22-23, wherein the user data is provided at the host computer by executing a host application, the method further comprising, at the UE, executing a client application associated with the host application.
25. The method of any of embodiments 22-24, further comprising operations corresponding to any of the methods of embodiments 1-9, said operations performed by a base station centralized unit (CU) node.
26. A communication system including a host computer comprising a communication interface configured to receive user data originating from a transmission from a user equipment (UE) to an access node; and integrated access backhaul (IAB) node comprising a radio interface and processing circuitry configured to perform operations corresponding to any of the methods of embodiments 10-15.
27. The communication system of embodiment 26, further including a base station centralized unit (CU) node configurable to perform operations corresponding to any of the methods of embodiments 1-9.
28. The communication system of any of embodiments 26-27, further including the UE, wherein the UE is configured to communicate with the IAB node.
29. The communication system of any of embodiments 26-28, wherein:
   the processing circuitry of the host computer is configured to execute a host application;
   the UE is configured to execute a client application associated with the host application, thereby providing the user data to be received by the host computer.

There are, proposed herein, various embodiments which address one or more of the issues disclosed herein. Thus, certain embodiments may provide the technical advantage of providing methods for preventing or recovering from PDCP packet loss in a multi-hop system where hop by hop RLC ARQ is employed. Certain embodiments may allow loss of PDCP packets to be prevented or mitigated in a multi-hop IAB scenario utilizing hop by hop ARQ, without involving higher layers, thereby preventing increased latency and throughput degradation.

BRIEF DESCRIPTION OF DRAWINGS

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Figure 1:
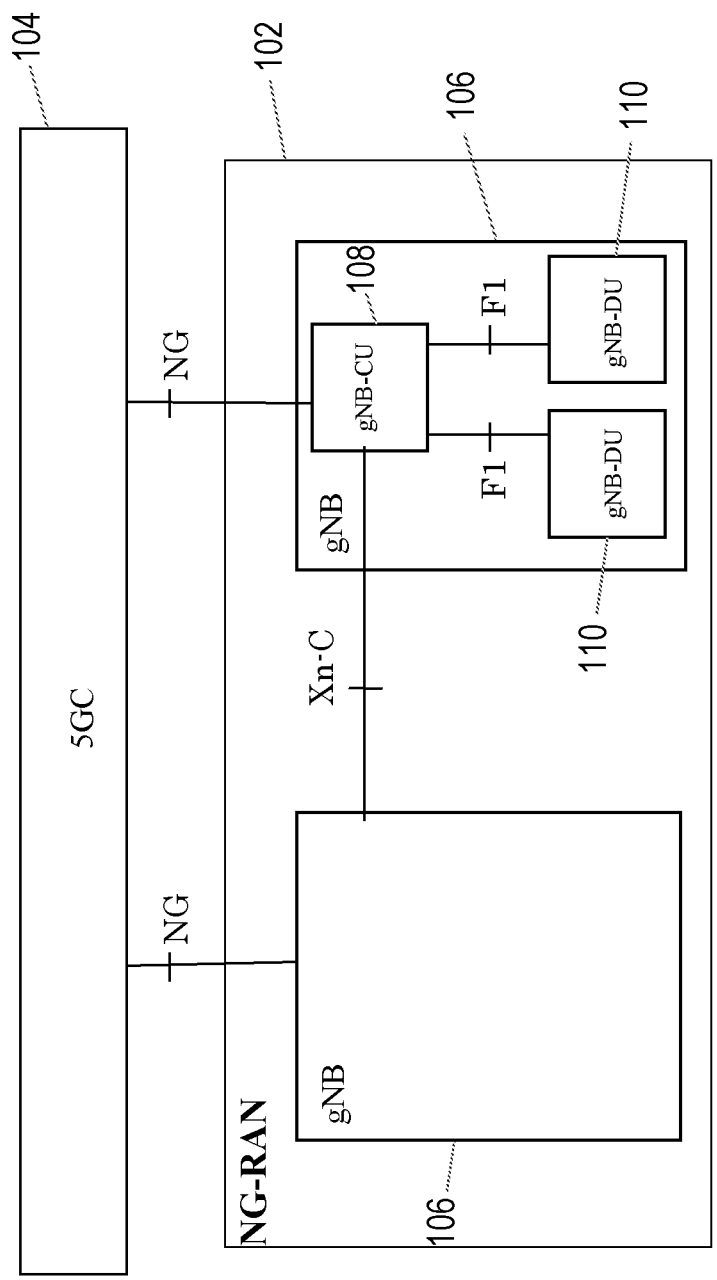
FIG. 1 illustrates an architecture with separate Central Units and Distributed Units.

FIG. 1 below illustrates a high-level view of the 5G network architecture, consisting of a Next Generation Radio Access Network (NG-RAN) 102 and a 5G Core (5GC) 104. The NG-RAN can comprise a set of gNodeB's (gNBs) 106 connected to the 5GC via one or more NG interfaces, whereas the gNBs can be connected to each other via one or more Xn interfaces. Each of the gNBs can support frequency division duplexing (FDD), time division duplexing (TDD), or a combination thereof. The radio technology for the NG-RAN is often referred to as "New Radio" (NR).

The NG RAN logical nodes shown in FIG. 1 (and described in TS 38.401 and TR 38.801) include a Central Unit (CU or gNB-CU) 108 and one or more Distributed Units (DU or gNB-DU) 110. The CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.) The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

Furthermore, the F1 interface between the gNB-CU and gNB-DU is specified, or based on, the following general principles:

F1 is an open interface;

F1 supports the exchange of signalling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user-quipment (UE) associated information and non-UE associated information;

F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU ican host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Figure 2:
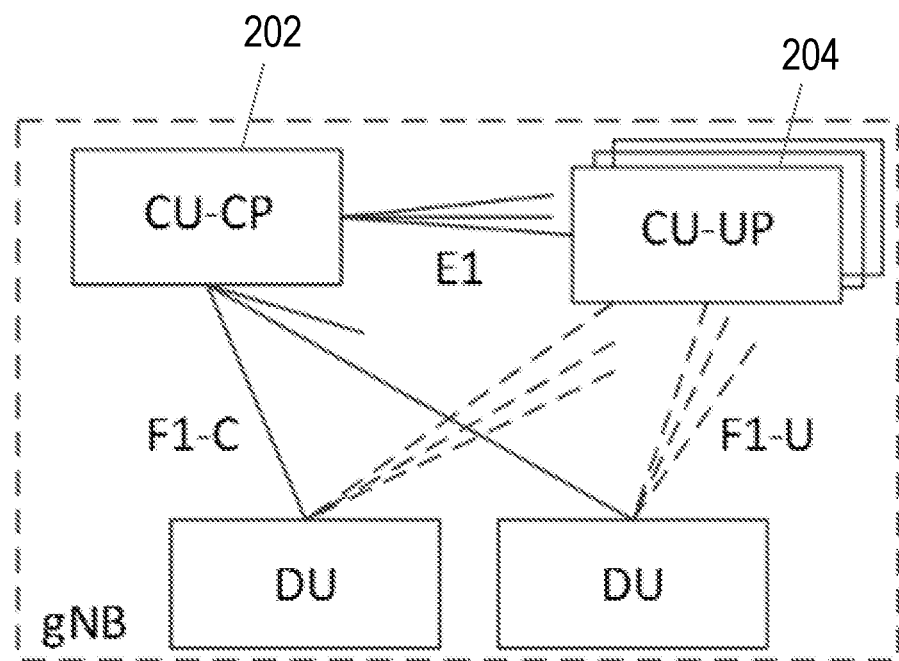
FIG. 2 illustrates an architecture with separation of the Central Unit Control Plane and User Plane.

It has also been agreed in 3GPP RAN3 Working Group (WG) to support a separation of the gNB-CU, as illustrated in FIG. 2, into a CU-CP function 202 (including RRC and PDCP for signaling radio bearers) and CU-UP function 204 (including PDCP for user plane). The CU-CP and CU-UP parts communicate with each other using the E1-AP protocol over the E1 interface.

In the architecture identified by CUs and DUs, Dual Connectivity (DC) can be achieved by means of allowing a UE to connect to multiple DUs served by the same CU or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative. One such approach is an integrated access backhaul (IAB) network where the operator can utilize part of the radio resources for the backhaul link.

IAB has been studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node (2) on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time critical RLC/MAC/PHY protocols from less time critical RRC/PDCP protocols. It is anticipated that a similar split could also be applied for the IAB case. Other IAB-related differences anticipated in NR as compared to LTE are the support of multiple hops and the support of redundant paths.

Figure 3:
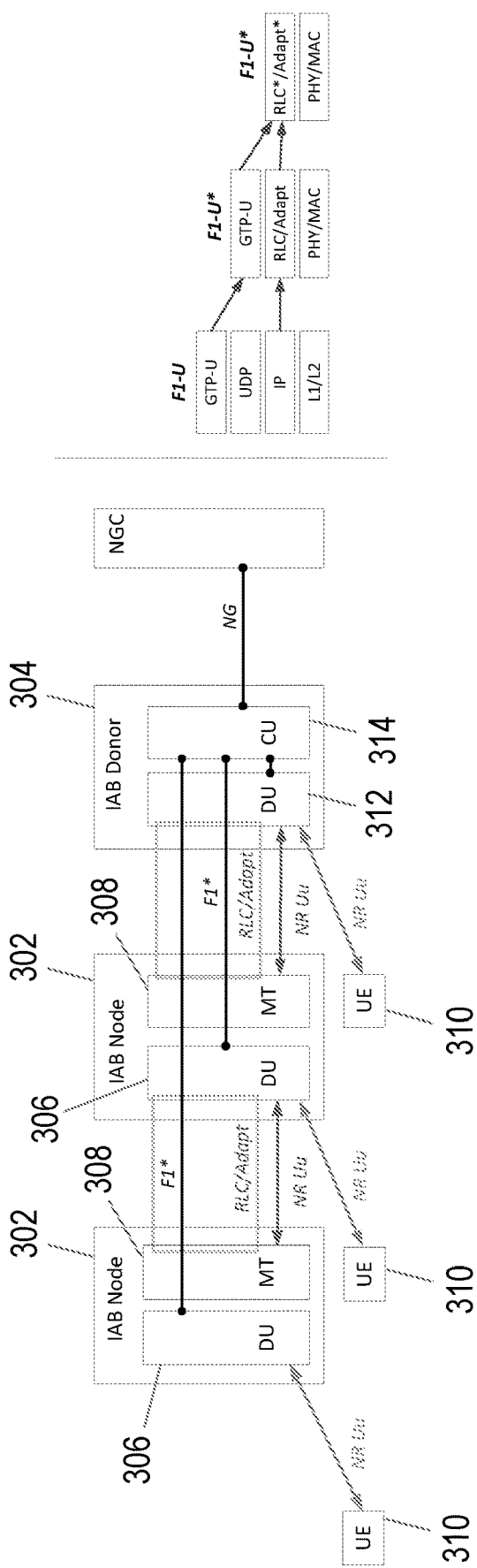
FIG. 3 is a first reference diagram for an architecture as described herein.

Currently 3GPP TS 38.874 (version 0.2.1) specifies several reference architectures for supporting user plane traffic over IAB nodes, including IAB Donor nodes. FIG. 3 below shows a block diagram of one reference architecture "1 a", which leverages the CU/DU split architecture in a two-hop chain of IAB nodes 302 underneath an IAB-donor 304.

In this architecture, each IAB node 302 holds a DU 306 and an MT 308. Via the MT 308, the IAB-node connects to an upstream IAB-node or the IAB-donor 304. Via the DU 306, the IAB-node establishes RLC-channels to UEs 310 and to MTs 308 of downstream IAB-nodes 302. For MTs, this RLC-channel may refer to a modified RLC*. Whether an IAB node can connect to more than one upstream IAB-node or IAB-donor is for further study.

The IAB Donor 304 also includes a DU 312 to support UEs and MTs of downstream IAB nodes. The IAB-donor holds a CU 314 for the DUs of all IAB-nodes and for its own DU. It is FFS if different CUs can serve the DUs of the IAB-nodes. Each DU on an IAB-node connects to the CU in the IAB-donor using a modified form of F1, which is referred to as F1*. F1*-U runs over RLC channels on the wireless backhaul between the MT on the serving IAB-node and the DU on the donor. F1*-U transport between MT and DU on the serving IAB-node as well as between DU and CU on the donor is for further study. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop.

The right side of FIG. 3 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM. Details of F1*, the adaptation layer, RLC*, hop-by-hop forwarding, and transport of F1-AP are for further study. Protocol translation between F1* and F1 in case the IAB-donor is split is also for further study.

Figure 4:
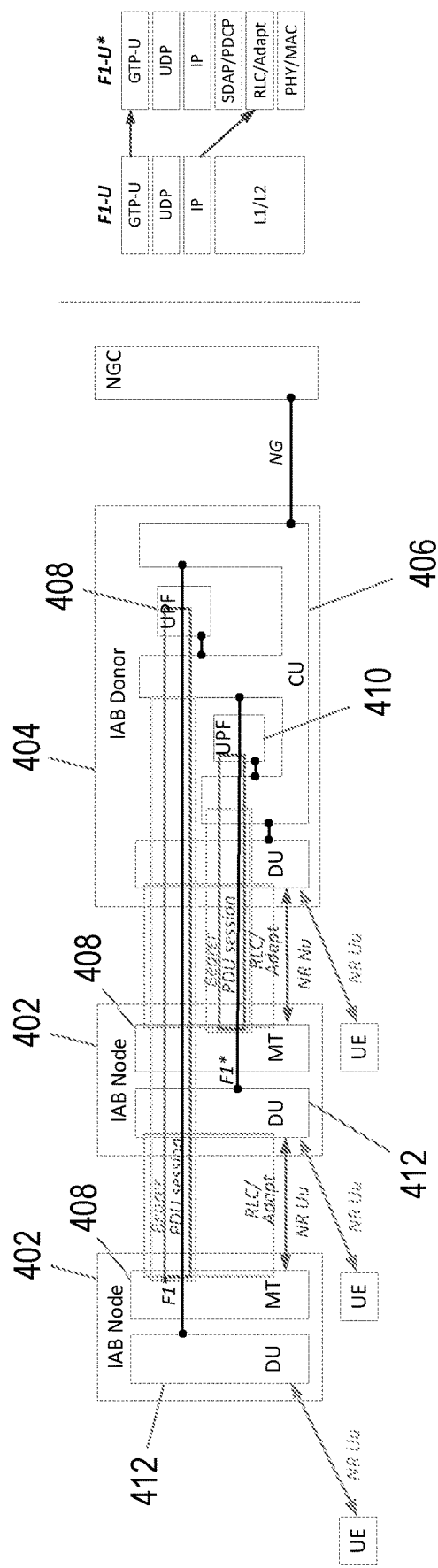
FIG. 4 is a reference diagram for an architecture as described herein.
Figure 5:
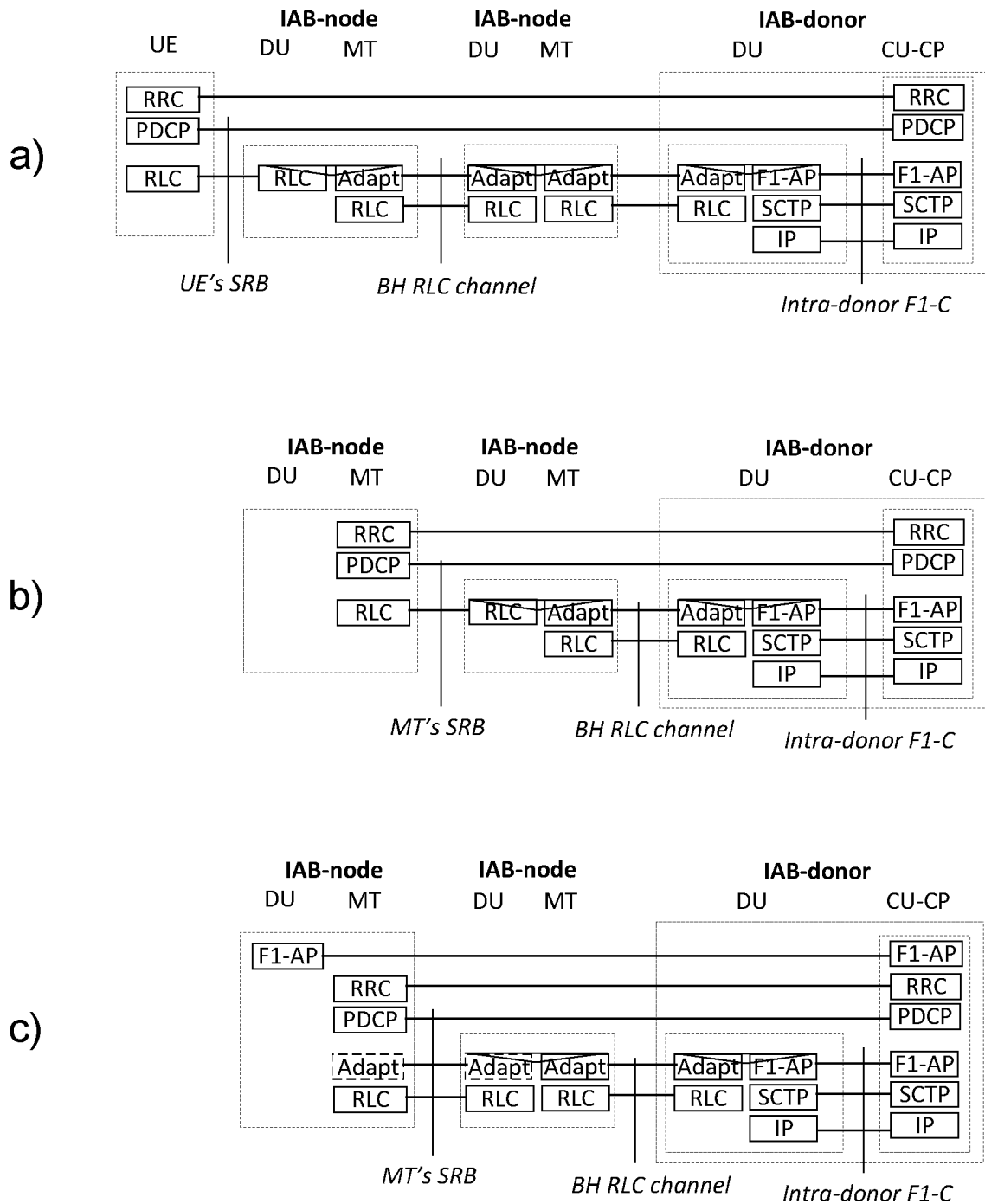
FIG. 5 illustrates examples of protocol stacks for UE access.
Figure 6:
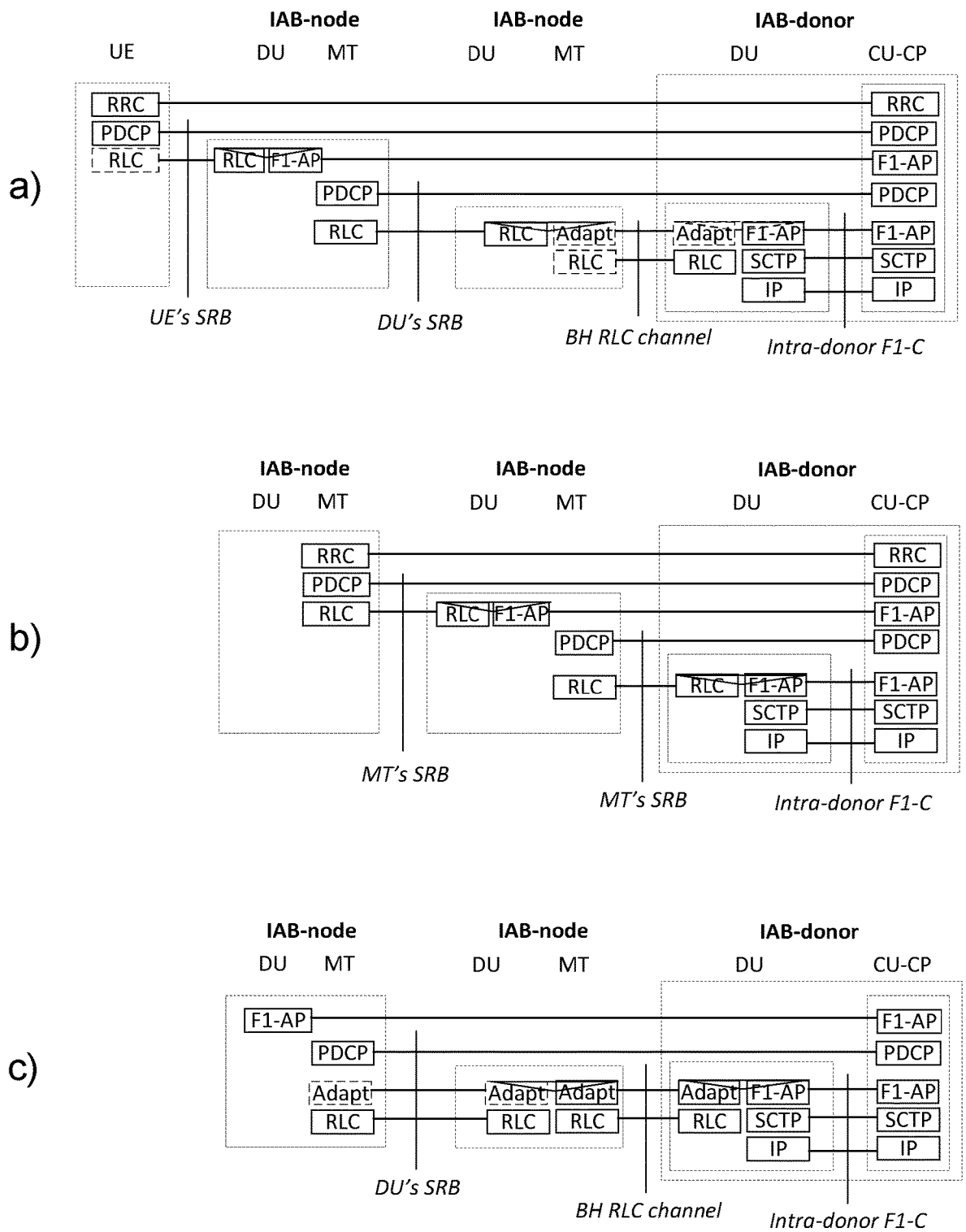
FIG. 6 illustrates examples of protocol stacks for UE access.
Figure 7:
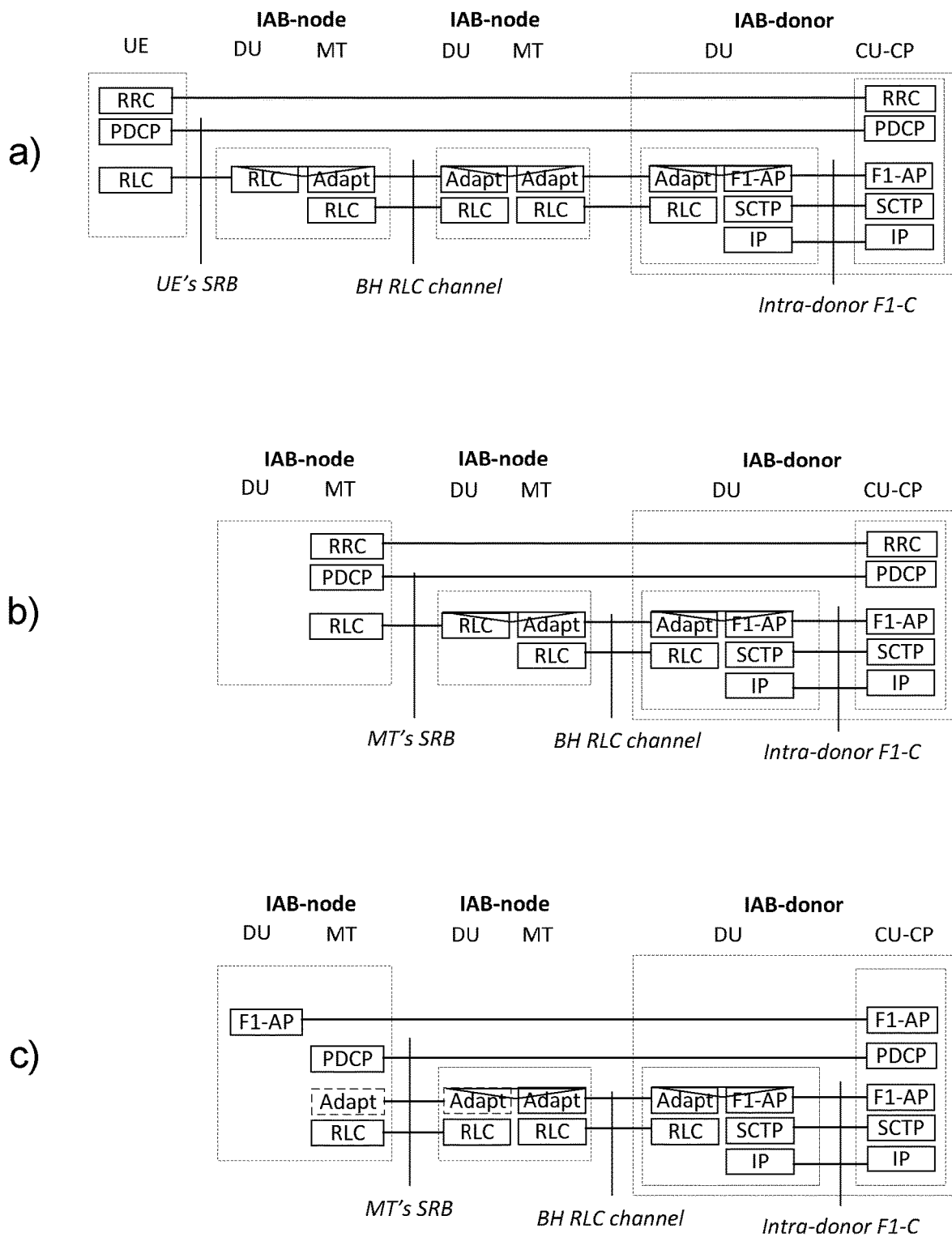
FIG. 7 illustrates an example of an alternative protocol stack.
Figure 8:
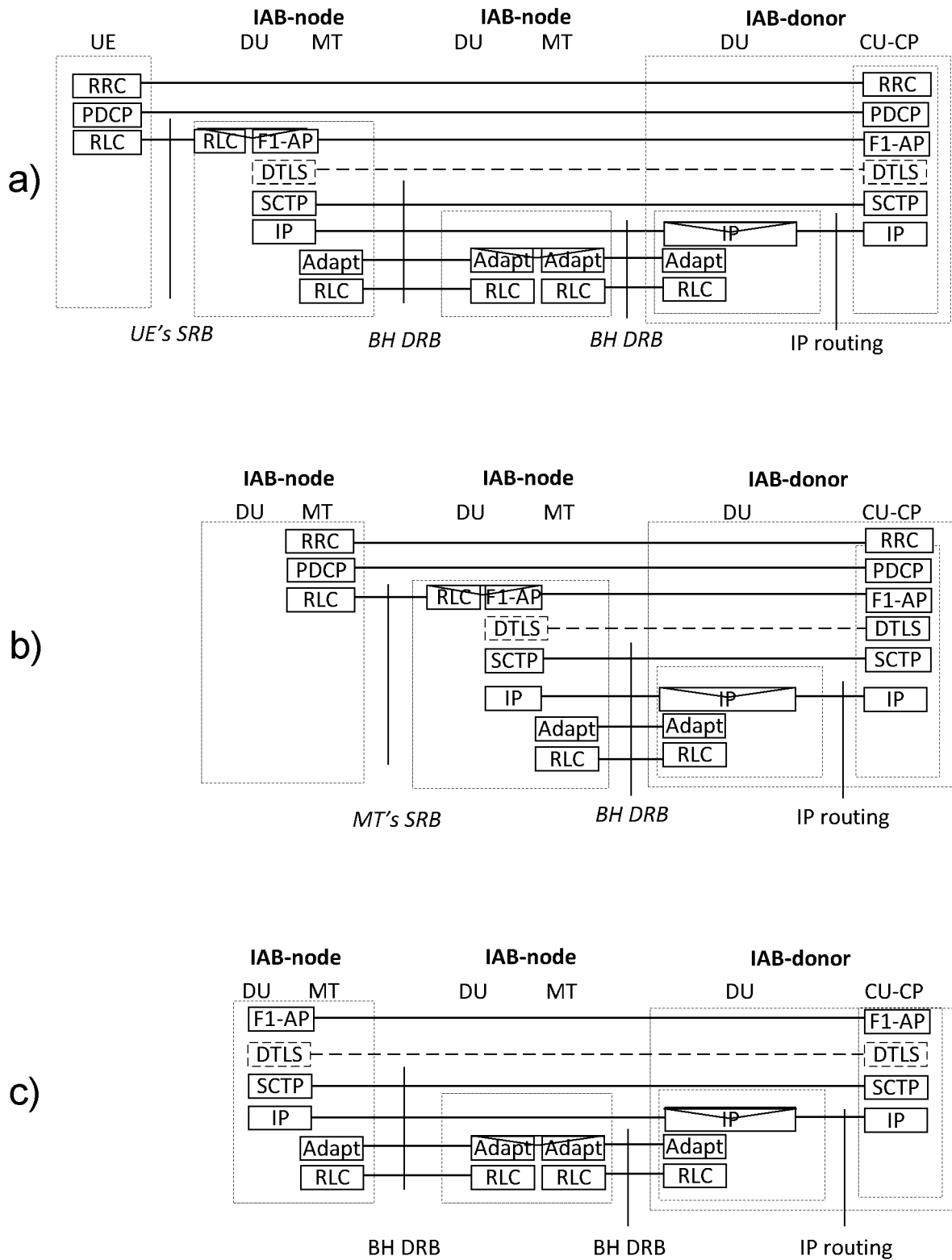
FIG. 8 illustrates an example of an alternative protocol stack.

FIG. 4 shows a block diagram of one reference architecture "1 b", which also leverages the CU/DU split architecture in a two-hop chain of IAB nodes 402 underneath an IAB-donor 404. The IAB-donor 404 holds only one logical CU 406. In this architecture, each IAB-node and the IAB-donor hold the same functions as in architecture 1a. Also, as in architecture 1a, every backhaul link establishes an RLC-channel, and an adaptation layer is inserted to enable hop-by-hop forwarding of F1*.

In architecture 1b, however, the MT 408 on each IAB-node 402 establishes a PDU-session with a User Plane Function (UPF) 410 residing on the donor. The MT's PDU-session carries F1* for the collocated DU 412. In this manner, the PDU-session provides a point-to-point link between CU and DU. On intermediate hops, the PDCP-PDUs of F1* are forwarded via an adaptation layer in the same manner as described for architecture 1a. The right side of FIG. 4 shows an example of the F1*-U protocol stack.

Referring again to architecture 1*a* shown in FIG. 3, user plane (UP) and control-plane (CP, e.g., RRC) traffic can be protected via PDCP over the wireless backhaul. A mechanism is also needed for protecting F1-AP traffic over the wireless backhaul. Four alternatives for protecting CP traffic are shown in FIGS. 5-8 below.

FIG. 5*a-c* shows exemplary UE RRC, MT RRC, and DU F1-AP protocol stacks for a first alternative, also referred to as "alternative 1". In this alternative, the adaptation layer is placed on top of RLC, and RRC connections for UE RRC and MT RRC are carried over a signalling radio bearer (SRB). On the UE's or MT's access link, the SRB uses an RLC-channel; whether the RLC channel has an adaptation layer is for further study.

On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is encapsulated in RRC of the collocated MT. F1-AP is therefore protected by the PDCP of the underlying SRB. Within the IAB-donor, the baseline is to use native F1-C stack.

FIG. 6*a-c* shows exemplary UE RRC, MT RRC, and DU F1-AP protocol stacks for a second alternative, also referred to as "alternative 2". Similar to alternative 1, RRC connections for UE RRC and MT RRC are carried over a signalling radio bearer (SRB), and the SRB uses an RLC-channel on the UE's or MT's access link.

In contrast, on the wireless backhaul links, the SRB's PDCP layer is encapsulated into F1-AP. The DU's F1-AP is carried over an SRB of the collocated MT. F1-AP is protected by this SRB's PDCP. On the wireless backhaul links, the PDCP of the F1-AP's SRB is carried over RLC-channels with adaptation layer. The adaptation layer placement in the RLC channel is the same for CP as for UP. The information carried on the adaptation layer may be different for SRB than for DRB. Within the IAB-donor, the baseline is to use native F1-C stack.

FIG. 7*a-c* shows exemplary UE RRC, MT RRC, and DU F1-AP protocol stacks for a third alternative, also referred to as "alternative 3". In this alternative, the adaptation layer is placed on top of RLC, and RRC connections for UE and MT are carried over a signalling radio bearer (SRB). On the UE's or MT's access link, the SRB uses an RLC-channel; whether the RLC channel has an adaptation layer is for further study.

On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is also carried over an SRB of the collocated MT. F1-AP is therefore protected by the PDCP of this SRB. On the wireless backhaul links, the PDCP of this SRB is also carried over RLC-channels with adaptation layer. Within the IAB-donor, the baseline is to use native F1-C stack.

FIG. 8*a-c* shows exemplary UE RRC, MT RRC, and DU F1-AP protocol stacks for a fourth alternative, also referred to as "alternative 4". In this alternative, the adaptation layer is placed on top of RLC, and all F1-AP signalling is carried over SCTP/IP to the target node. The IAB-donor maps DL packets based on target node IP to adaptation layer used on backhaul DRB. Separate backhaul DRBs can be used to carry F1-AP signalling from F1-U related content. For example, mapping to backhaul DRBs can be based on target node IP address and IP layer Diffsery Code Points (DSCP) supported over F1 as specified in 3GPP TS 38.474.

In alternative 4, a DU will also forward other IP traffic to the IAB node (e.g., OAM interfaces). The IAB node terminates the same interfaces as a normal DU except that the L2/L1 protocols are replaced by adaptation/RLC/MAC/PHY-layer protocols. F1-AP and other signalling are protected using NDS (e.g., IPSec, DTLS over SCTP) operating in the conventional way between DU and CU. For example, SA3 has recently adopted the usage of DTLS over SCTP (as specified in IETF RFC6083) for protecting F1-AP.

In addition to the CP considerations discussed above, there are various user plane (UP) considerations for architecture group 1 (i.e., architectures 1*a* and 1*b*) including placement of an adaptation layer, functions supported by the adaptation layer, support of multi-hop RLC, impacts on scheduler and QoS. These are illustrated by exemplary protocol stacks for architectures 1*a* and 1*b* shown in FIGS. 9 and 10, respectively, below. Although RLC channels serving for backhauling include the adaptation layer, it is for further study (FFS) if the adaptation layer is also included in IAB-node access links (e.g., adapt is dashed in FIG. 10).

The UE establishes RLC channels to the DU on the UE's access IAB node in compliance with TS 38.300. Each of these RLC-channels is extended via a potentially modified form of F1-U, referred to as F1*-U, between the UE's access DU and the IAB donor. The information embedded in F1*-U is carried over RLC-channels across the backhaul links.

Transport of F1*-U over the wireless backhaul is enabled by an adaptation layer, which is integrated with the RLC channel. Within the IAB-donor (referred to as fronthaul), the baseline is to use native F1-U stack. The IAB-donor DU relays between F1-U on the fronthaul and F1*-U on the wireless backhaul.

Figure 9:
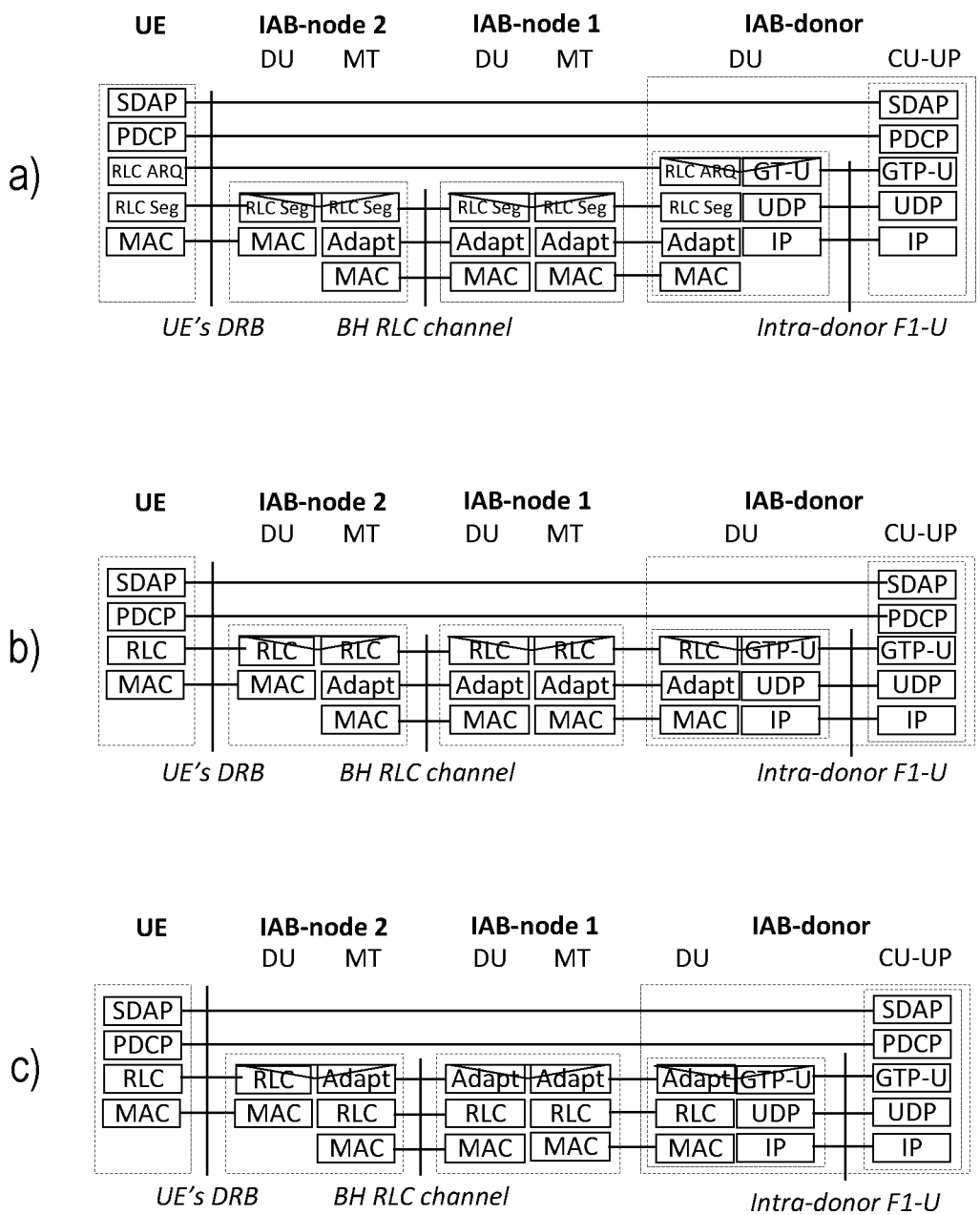
FIG. 9 illustrates an example of an alternative protocol stack.
Figure 9:
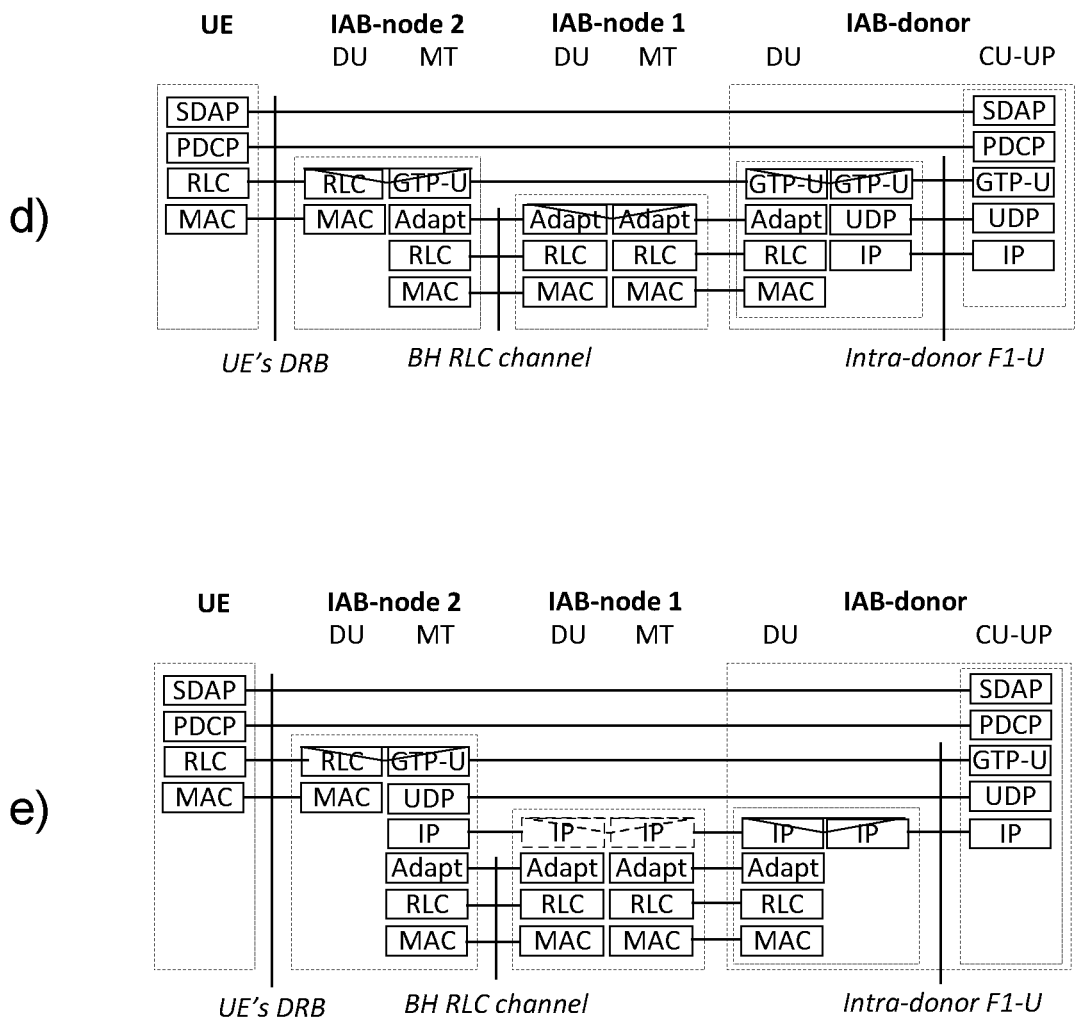

Specifically, FIG. 9 shows examples of protocol stacks for UE-access using L2-relaying with adaptation layer for architecture 1*a*.

Figure 10:
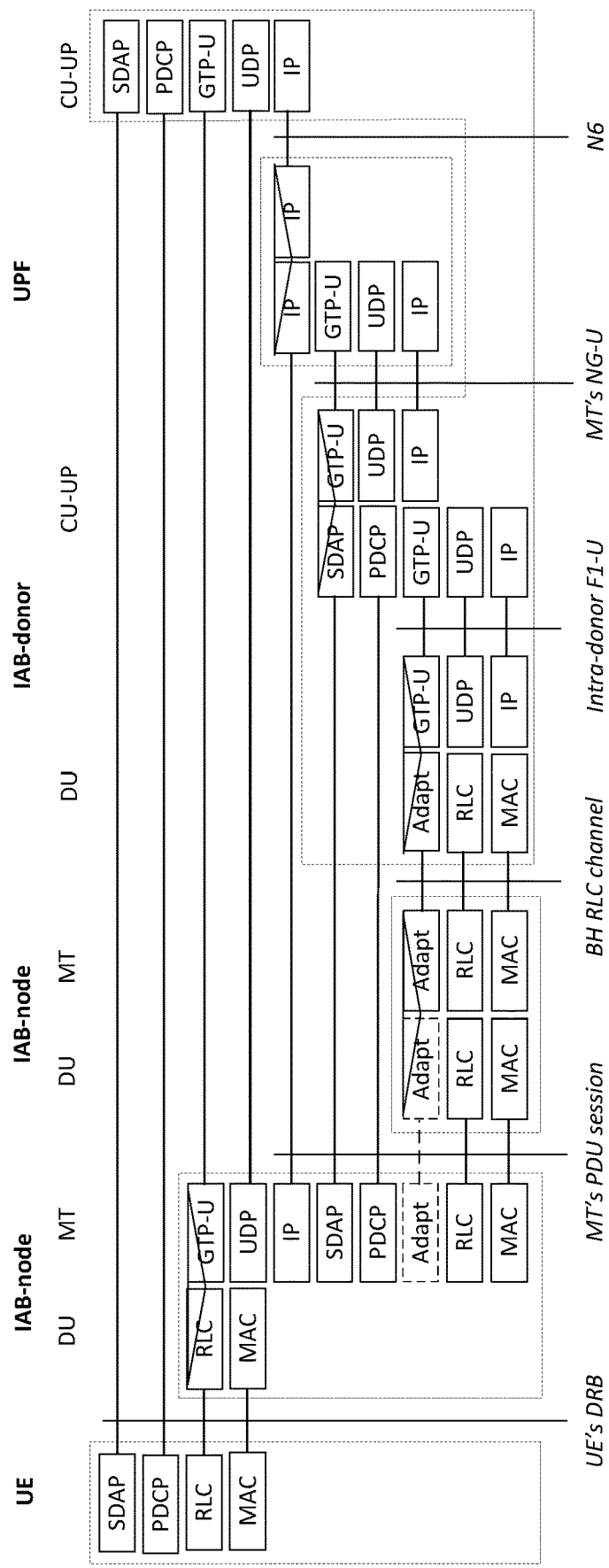
FIG. 10 illustrates an example of an alternative protocol stack.

FIG. 10 shows examples of protocol stacks for UE-access using L2-relaying with adaptation layer for architecture 1*b*.

In architecture 1*a*, information carried on the adaptation layer supports the following functions:
 Identification of the UE-bearer for the PDU,
 Routing across the wireless backhaul topology,
 QoS-enforcement by the scheduler on DL and UL on the wireless backhaul link,
 Mapping of UE user-plane PDUs to backhaul RLC channels,
 Others.

In architecture 1*b*, information carried on the adaptation layer supports the following functions:
 Routing across the wireless backhaul topology,
 QoS-enforcement by the scheduler on DL and UL on the wireless backhaul link,
 Mapping of UE user-plane PDUs to backhaul RLC channels
 Others.

Information to be carried on the adaptation layer can include, but is not limited to:
 UE-bearer-specific Id
 UE-specific Id
 Route Id, IAB-node or IAB-donor address
 QoS information
 Potentially other information Further study will be done within 3GPP to identify, which of the information on the adaptation layer is processed to support the above functions on each on-path IAB-node (hop-by-hop), and/or on the UE's access-IAB-node and the IAB-donor (end-to-end).

The following options are available for placement of adaptation layer into L2 stack:
- integrated with MAC layer or above MAC layer (examples shown in FIG. 9a-b),
- above RLC layer (examples shown in FIG. 9d-e and FIG. 10).

The adaptation layer may consist of sublayers. It is perceivable, for example, that the GTP-U header becomes a part of the adaptation layer. It is also possible that the GTP-U header is carried on top of the adaptation layer to carry end-to-end association between the IAB-node DU and the CU (example is shown in FIG. 9d).

Alternatively, an IP header may be part of the adaptation layer or carried on top of the adaptation layer. One example is shown in FIG. 5e. In this example, the IAB-donor DU holds an IP routing function to extend the IP-routing plane of the fronthaul to the IP-layer carried by adapt on the wireless backhaul. This allows native F1-U to be established end-to-end, i.e. between IAB-node DUs and IAB-donor CU-UP. The scenario implies that each IAB-node holds an IP-address, which is routable from the fronthaul via the IAB-donor DU. The IAB-nodes' IP addresses may further be used for routing on the wireless backhaul.

Note that the IP-layer on top of Adapt does not represent a Protocol Data Unit (PDU) session. The MT's first hop router on this IP-layer therefore does not have to hold a UPF.

The design of the adaption header is FFS.

Various other aspects of the placement of the adaptation layer can be considered. For example, an above-RLC adaptation layer can only support hop-by-hop ARQ. The above-MAC adaptation layer can support both hop-by-hop and end-to-end ARQ. On the other hand, both adaptation layer placements can support aggregated routing (e.g. by inserting an IAB-node address into the adaptation header) and both adaptation layer placements can support per-UE-bearer QoS for a large number of UE-bearers. For above-RLC adaptation layer, the LCID space has to be enhanced since each UE-bearer is mapped to an independent logical channel. For above-MAC adaptation layer, UE-bearer-related info has to be carried on the adaptation header.

In addition, both adaptation layer placements can support aggregated QoS handling e.g. by inserting an aggregated QoS Id into the adaptation header. Note that aggregated QoS handling reduces the number of queues. This is independent on where the adaptation layer is placed. In addition, for both adaptation layer placements, aggregation of routing and QoS handling allows proactive configuration of intermediate on-path IAB-nodes, i.e. configuration is independent of UE-bearer establishment/release. Likewise, for both adaptation layer placements, RLC ARQ can be pre-processed on TX side.

For RLC AM, ARQ can be conducted hop-by-hop along access and backhaul links (FIG. 9c-e and FIG. 10). It is also possible to support ARQ end-to-end between UE and IAB-donor (FIG. 9a-b). Since RLC segmentation is a just-in-time process it is always conducted in a hop-by-hop manner. The type of multi-hop RLC ARQ and adaptation-layer placement have the following interdependence:
- End-to-end: Adaptation layer is integrated with MAC layer or placed above MAC layer
- Hop-by-hop: No interdependence Table 1 below provides a summary comparison between end-to-end and hop-by-hop RLC ARQ.

| Metric | Hop-by-hop RLC ARQ | End-to-end RLC ARQ |
| --- | --- | --- |
| Forwarding latency | Potentially higher as packets have to pass through RLC-state machine on each hop. | Potentially lower as packets do not go through the RLC state machine on intermediate IAB-nodes. |
| Latency due to retransmission | Independent of number of hops | Increases with number of hops |
| Capacity | Packet loss requires retransmission only on one link. Avoids redundant retransmission of packets over links where the packet has already been successfully transmitted. | Packet loss may imply retransmission on multiple links, including those where the packet was already successfully transmitted. |
| Hop count limitation due to RLC parameters | Hop count is not affected by max window size. | Hop count may be limited by the end-to-end RLC latency due to max window size. |
| Hop count limitation due to PCDP parameters | Hop count may be limited by increasing disorder of PDCP PDUs over sequential RLC ARQ hops. This may increase probability to exceed max PDCP window size. | Hop count does not impact disorder of PDCP PDUs due to RLC ARQ. |
| Processing and memory impact on intermediate IAB-nodes | Larger since processing and memory can be required on intermediate IAB-nodes. | Smaller since intermediate path-nodes do not need ARQ state machine and flow window. |
| RLC specification impact | No stage-3 impact expected | Potential stage-3 impact |

-continued

| Metric | Hop-by-hop RLC ARQ | End-to-end RLC ARQ |
| --- | --- | --- |
| Operational impact for IAB-node to IAB-donor upgrades | IAB-nodes and IAB-donors use the same hop-by-hop RLC ARQ. As a result, this functionality is completely unaffected by the upgrade of IAB-node to IAB-donor at availability of fiber, potentially reducing the effort required to confirm proper operation. | End-to-end RLC ARQ results in a greater architectural difference between IAB nodes vs. IAB donor nodes. As a result, additional effort can be required to complete an upgrade of an IAB node to an IAB donor upon availability of fiber. |
| Configuration complexity | RLC timers are not dependent on hop-count. | RLC timers become hop-count dependent. |

F1-U protocol (also referred to as NR User Plane Protocol) is used to convey control information related to the user data flow management of data radio bearers (TS 38.425; NR User Plane Protocol). The F1-U protocol data is conveyed by GTP-U protocol, specifically, by means of the "RAN Container" GTP-U extension header defined in (TS 29.281; GPRS Tunnel Protocol User Plane.

The GTP-U protocol over UDP over IP serves as the TNL for data streams on the F1 interface. The transport bearer is identified by the GTP-U tunnel endpoint ID (TEID) and the IP address (source TEID, destination TEID, source IP address, destination IP address). The F1-U protocol uses the services of the TNL in order to allow flow control of user data packets transferred from the node hosting NR PDCP (CU-UP in the case of CU-DU split) to the corresponding node (DU).

The following services provided by F1-U are defined in 3GPP TS 38.425:
  Provision of NR user plane specific sequence number information for user data transferred from the node hosting NR PDCP to the corresponding node for a specific data radio bearer.
  Information of successful in sequence delivery of NR PDCP PDUs to the UE from the corresponding node for user data associated with a specific data radio bearer.
  Information of NR PDCP PDUs that were not delivered to the UE or the lower layers.
  Information of NR PDCP PDUs transmitted to the lower layers for user data associated with a specific data radio bearer.
  Information of downlink NR PDCP PDUs to be discarded for user data associated with a specific data radio bearer;
  Information of the currently desired buffer size at the corresponding node for transmitting to the UE user data associated with a specific data radio bearer.
  Information of the currently minimum desired buffer size at the corresponding node for transmitting to the UE user data associated with all data radio bearers configured for the UE at the corresponding node;
  Information of successful in sequence delivery of NR PDCP PDUs to the UE from the corresponding node for retransmission user data associated with a specific data radio bearer;
  Information of NR PDCP PDUs transmitted to the lower layers for retransmission user data associated with a specific data radio bearer.
  Information of the specific events at the corresponding node (e.g. radio link outage, radio link resume)

Basically, F1-U provides the flow control mechanism so that the node where the PDCP is terminated (CU or CU-UP in the case where there is a CU-CP/CU-UP split) will not keep overloading the DU by sending it too much data if data was not being delivered fast enough over the UE-DU air interface (e.g. due to bad radio conditions).

An important consequence of not using GTP-U for F1-U is the lack of flow control mechanism for user data packets. In the IAB UP architecture alternatives that do not employ full F1-U protocol stack (e.g. FIG. 5a, FIG. 5b, and FIG. 5c), the CU-UP is only aware of how much traffic goes through the first wireless backhaul hop (through the flow control of the F1-U between the CU-UP and donor DU), while it is completely unaware of the status of the UP data flow on subsequent wireless backhaul links. If the first wireless backhaul link (between donor DU and IAB node 1) is in a good condition, regardless of the radio/buffering conditions on subsequent links/nodes, the CU-UP will keep feeding the donor DU with traffic. In the two hop IAB system depicted in FIG. 5, if the link between IAB node 1 and IAB node 2 experiences poor channel conditions, this may lead to buffer overflow on IAB1, causing data loss.

As discussed above, the adaptation layer for IAB can be either below or above RLC, and RLC ARQ can be performed hop by hop or end to end (i.e. between the donor DU and the IAB node). Performing the RLC ARQ hop by hop has several advantages as compared to end to end ARQ, as summarized by Table 1 above. Even so, there can be problems with packet losses on the PDCP layer using the hop-by-hop ARQ that are not addressed by conventional approaches.

Figure 11:
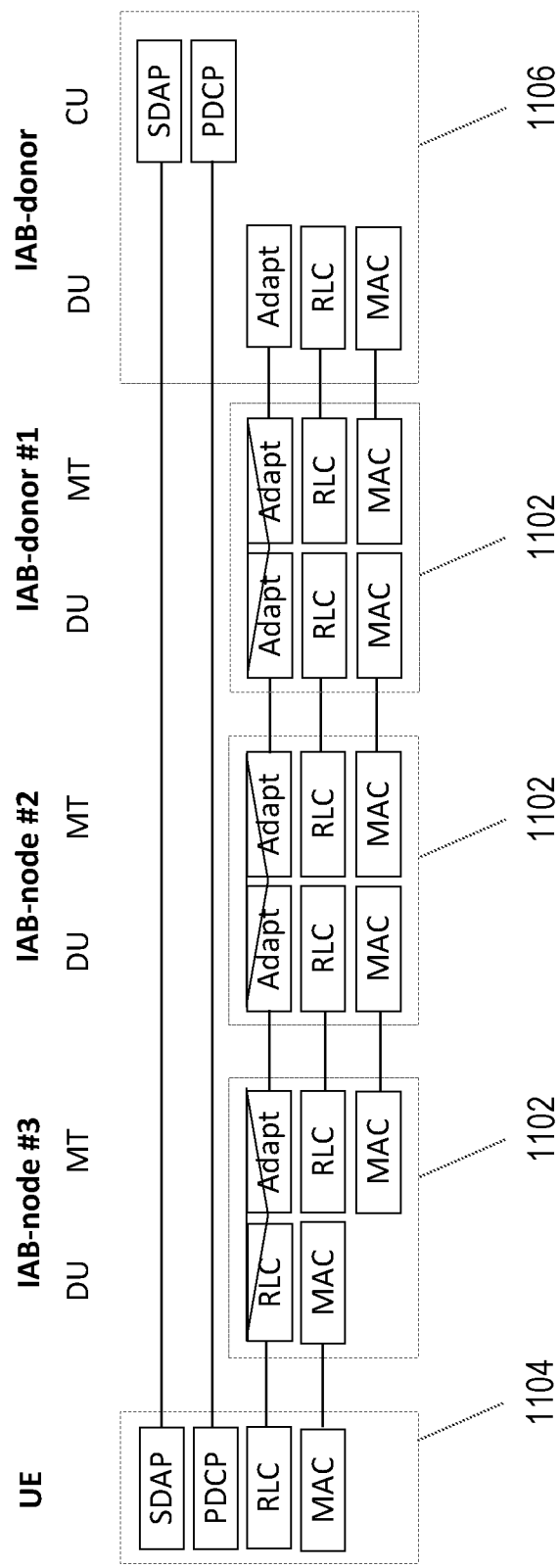
FIG. 11 is a protocol stack diagram for an example of a multi-hop scenario.

Consider the example scenario shown in FIG. 11 below involving three hops, i.e. with three IAB nodes 1102 between the UE 1104 and the IAB donor 1106. Note that this figure focuses on the adaptation layer placement and RLC ARQ, such that certain details of the whole end-to-end protocol stack of the CU and IAB are omitted or ignored for clarity. In addition, the exemplary scenario shown in FIG. 11 corresponds with the arrangements shown in FIGS. 9c-e.

Assume there is a problem (e.g. radio link failure, RLF) on one hop and that hop is redirected via another IAB node. For example, the link between IAB2 and IAB3 fails, and the UE gets connected via UE←→IAB3←→IAB4←→IAB1←→IAB-donor. If the UE has deleted the PDCP packet already when it gets an ACK from RLC (which in the hop-by-hop case only cares about the transmission over the UE-IAB3 link), then there may be no way to retransmit the lost packet (on the IAB3 to IAB2 link that has failed). On the other hand, if end-to-end ARQ is used, there will be a retransmission timeout at the UE's RLC and the packet will be retransmitted.

In the PDCP specification (3GPP TS 38.323), section 5.3, regarding when the UE discards the PDCP SDU, it is written that:

"When the discardTimer expires for a PDCP SDU, or the successful delivery of a PDCP SDU is confirmed by PDCP status report, the transmitting PDCP entity shall discard the PDCP SDU along with the corresponding PDCP Data PDU. If the corresponding PDCP Data PDU has already been submitted to lower layers, the discard is indicated to lower layers. "For SRBs, when upper layers request a PDCP SDU discard, the PDCP entity shall discard all stored PDCP SDUs and PDCP PDUs.

"NOTE: Discarding a PDCP SDU already associated with a PDCP SN causes a SN gap in the transmitted PDCP Data PDUs, which increases PDCP reordering delay in the receiving PDCP entity. It is up to UE implementation how to minimize SN gap after SDU discard."

Thus, according to current PDCP specifications, in case where a path switch is done in one of the intermediate hops in an IAB system (or a temporary RLF occurs), PDCP packet losses could be incurred, and the packets have to be retransmitted end-to-end at the higher layer (e.g. TCP), which could cause service performance degradation including, but not limited to, high latency, reduced throughput, etc. (e.g., because TCP may be forced to perform congestion avoidance or even slow start).

As such, the PDCP specification does not mandate the deletion of the PDCP packet based on RLC ACKs. However, even if it is not explicitly required for UE to discard packets when ACK is indicated from lower layer, it is implicitly specified, because when PDCP should retransmit, due to PDCP recovery or re-establishment, only not yet ACKed PDUs are retransmitted. This is indicated by the references to "successful delivery . . . has not been confirmed" in the specification text below:

"NR PDCP reestablishment:
for AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:
perform header compression of the PDCP SDU as specified in the subclause 5.7.4;
perform integrity protection and ciphering of the PDCP SDU using the COUNT value associated with this PDCP SDU as specified in the subclause 5.9 and 5.8;
submit the resulting PDCP Data PDU to lower layer.
"NR PDCP data recovery
perform retransmission of all the PDCP Data PDUs previously submitted to re-established or released AM RLC entity in ascending order of the associated COUNT values from the first PDCP Data PDU for which the successful delivery has not been confirmed by lower layers."

Exemplary embodiments of the present disclosure address these and other problems, challenges, and/or issues by providing methods and/or procedures for preventing and/or recovering from PDCP packet loss in a multi-hop system where hop-by-hop RLC ARQ is employed. The exemplary methods and/or procedures utilize the flow control mechanisms available in GTP-U or SCTP with various enhancements to RLC layer. These exemplary embodiments provide various advantages, including prevention and/or mitigation of loss of PDCP packets in a multi-hop IAB scenario utilizing hop by hop ARQ, without involving higher layers, thereby preventing increased latency and throughput degradation. Advantages also include ease of upgrade for existing network installations and, since the changes required are in the network nodes, no upgrade is required to legacy UEs, broadening the scope of the IAB use cases.

In the embodiments described below, the text includes the phrases "the PDCP of the UE is configured with . . . " or the "RLC of the UE is configured with . . . ". Unless otherwise noted, this refers to the PDCP or the RLC of the UE bearers. This could be for all the bearers or a selected subset of bearers (depending on the QoS requirements of the bearers).

In general, embodiments are described below from UL traffic point of view. However, most of the embodiments are equally applicable for DL traffic.

It should be noted that the network can be aware of the path change that happens over the intermediate nodes (and it will probably be the donor CU/DU that sets up the new path, though autonomous path switch by intermediate nodes is not precluded, but in this case we assume the donor CU/DU will be informed about it). When the donor CU/DU becomes aware of the path change or initiates the path change, it can trigger the needed procedure (e.g. sending status PDUs, triggering PDCP recovery, etc.). In the descriptions below, we have focused on how these procedures have to be enhanced for the case of IAB and have not discussed on how the network discovers the path has changed.

Furthermore, although the embodiments are described below in the context of the IAB scenario, the underlying principles can be adapted to other exemplary embodiments applicable in any kind of multi-hop system where flow control functionality is available between network nodes.

Furthermore, although the embodiments are described primarily in terms of user plane (UP) traffic and the utilization of F1-U (i.e., GTP-U/UDP and associated flow control mechanisms), the underlying principles can be adapted for applicability to control plane (CP) traffic, where flow control is provided by SCTP/TCP instead of the GTP-U/UDP.

Furthermore, although the embodiments are described in terms of F1-U flow control mechanism between the CU-UP and the IAB node (e.g. FIG. 9e), this does not preclude other cases (e.g. FIG. 9a-c), if a flow control mechanism between the CU-UP and IAB node is provided by other mechanisms (e.g. enhanced adaptation layer).

Various exemplary embodiments of the present disclosure enhance the flow-control mechanisms currently employed over F1-U to support also UL flow control (e.g., CU sending UL data delivery status report to the IAB node).

Figure 12:
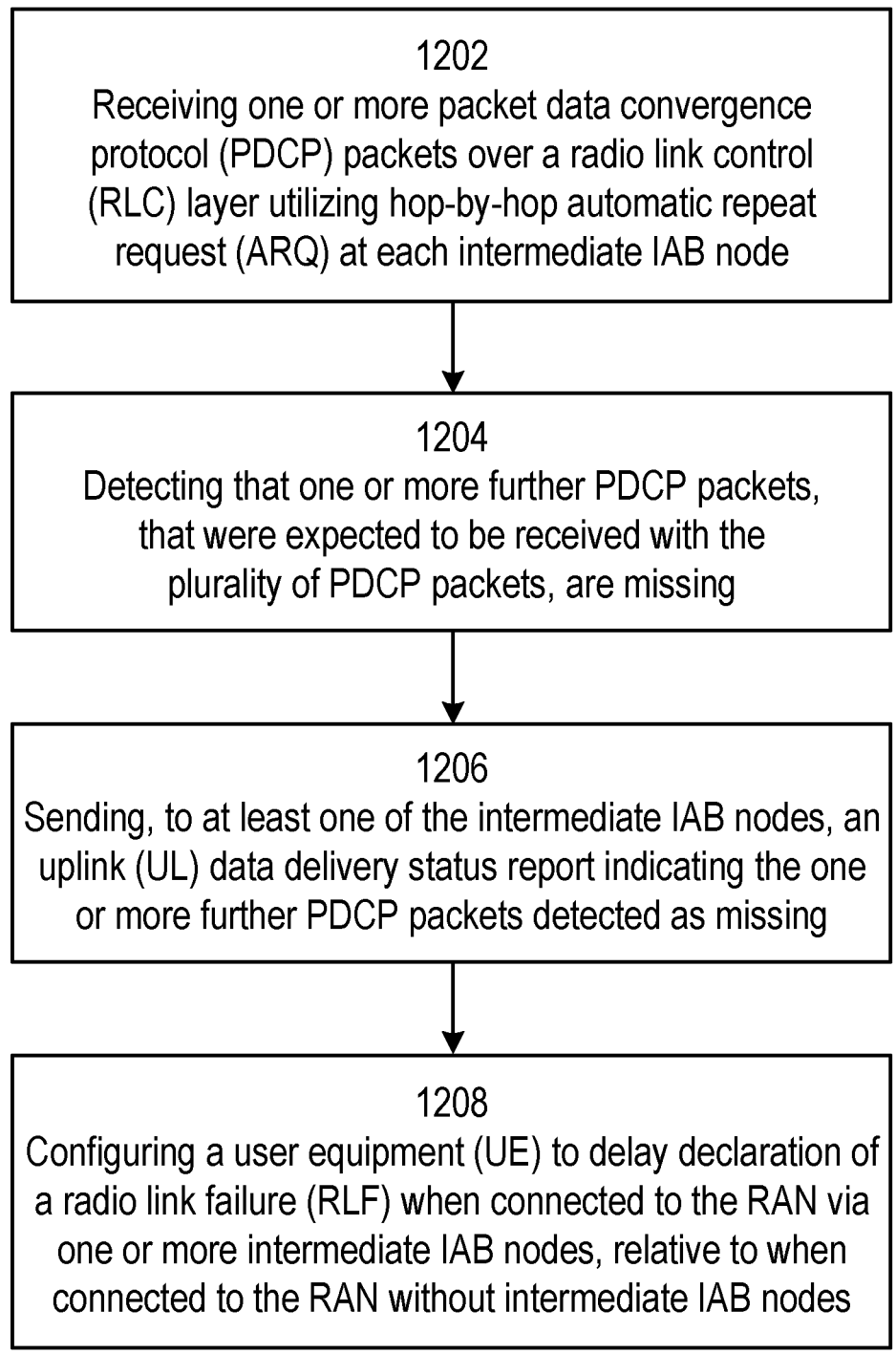
FIG. 12 is a flow chart illustrating a method in accordance with some embodiments.

FIG. 12 is a flow chart, illustrating an exemplary method and/or procedure performed by a base station centralized unit (CU) node in communication, using a packet data convergence protocol (PDCP), with a user equipment (UE) via one or more intermediate integrated access backhaul (IAB) nodes of a radio access network (RAN), in accordance with particular exemplary embodiments of the present disclosure. Although the exemplary method and/or procedure is illustrated in FIG. 12 by blocks in a particular order, this order is exemplary and the operations corresponding to the blocks can be performed in different orders, and can be combined and/or divided into blocks having different functionality than shown in FIG. 12. Furthermore, the exemplary method and/or procedure shown in FIG. 12 can be complimentary to other exemplary methods and/or procedures disclosed herein, such that they are capable of being used cooperatively to provide the benefits, advantages, and/or solutions to problems described hereinabove. For example, the exemplary method and/or procedure shown in FIG. 12 can be used with one or more of the exemplary methods and/or procedures shown in FIG. 13.

The exemplary method and/or procedure begins at block 1202, where the CU node can receive one or more PDCP packets over a radio link control (RLC) layer utilizing hop-by-hop automatic repeat request (ARQ) at each intermediate IAB node.

At block 1204, the CU node can detect that one or more further PDCP packets, that were expected to be received with the plurality of PDCP packets, are missing.

In block 1206, the CU node can send, to at least one of the intermediate IAB nodes, an uplink (UL) data delivery status report indicating the one or more further PDCP packets detected as missing. Thus, the uplink (UL) data delivery status report is sent in response to a trigger, and in this example the trigger is the detection that one or more further PDCP packets, that were expected to be received with the plurality of PDCP packets, are missing. The uplink (UL) data delivery status report then indicates the one or more further PDCP packets detected as missing.

In other examples, the trigger comprises: detecting a path change involving at least one of the intermediate IAB nodes; receiving a message from an IAB node; or receiving a predetermined amount of data (for example a predetermined number of data packets).

In block 1208, the CU node can configure the UE to delay declaration of a radio link failure (RLF) when connected to the RAN via one or more intermediate IAB nodes, relative to when connected to the RAN without intermediate IAB node.

Other variations of operations 1202-1208 are also possible according to exemplary embodiments.

In some exemplary embodiments, these enhancements can include an additional flag in the UL data delivery status, the flag indicating for the IAB node to retransmit the packets that are indicated to be missing. In some embodiments, the IAB node can retransmit the one or more packets indicated by the flag to be missing. This retransmission can be done substantially immediately after receipt of the flag, or after some later event.

In some exemplary embodiments, the IAB node can refrain from sending RLC acknowledgements to its peer RLC entity (e.g., UE), even if the RLC packets were received properly, until receiving an UL data delivery status from the CU confirming that the packets corresponding to this RLC packets have been received properly at the CU. In various embodiments, the IAB node can be configured to apply this behaviour to all UEs that it is serving, to a subset of UEs that it is serving (e.g., indicated when a UE gets connected to an IAB node), or even only to certain bearers of a particular UE or a particular QoS requirement (e.g., as part of the UE bearer setup and the corresponding RLC entity setup for that bearer at the IAB node).

In some exemplary embodiments, the IAB node can send RLC acknowledgements to the peer entity (e.g., UE) corresponding to all the packets that have been indicated to be received by the UL data delivery status.

In some exemplary embodiments, when a path change is detected by the network (either triggered by the CU/DU or triggered by the intermediate IAB nodes and communicated to the CU/DU), the CU can send a fast/immediate UL data delivery status to the IAB node, which can result in a faster recovery.

In some exemplary embodiments, the IAB node can trigger and/or poll the sending of the UL data delivery status from the CU. In some exemplary embodiments, the CU can send a periodic UL data delivery status to the IAB node. In some exemplary embodiments, the CU can send an UL data delivery status to the IAB node wherever the CU receives a certain number of packets or certain amount of UL data (e.g., threshold-based). In other exemplary embodiments, a combination of polling, periodic, and threshold-based criteria can be used by the CU in determining when to send an UL data delivery status.

In other exemplary embodiments, an RLC entity (e.g., within a UE) can be configured with one or more parameters that increase the time until an RLF is triggered, when it is determined that the UE is connected to the network via an IAB node. For example, the maxRetryThreshold of the UE's RLC entity can be increased, such that a declaration of RLF is delayed. In some embodiments, the value of the parameter (e.g., maxRetrxThreshold) can be determined based on the number of hops to the UE (e.g. a UE connected via n hops may be configured with a maxRetryThreshold value that is smaller than for a UE connected via n+1 hops).

Figure 13:
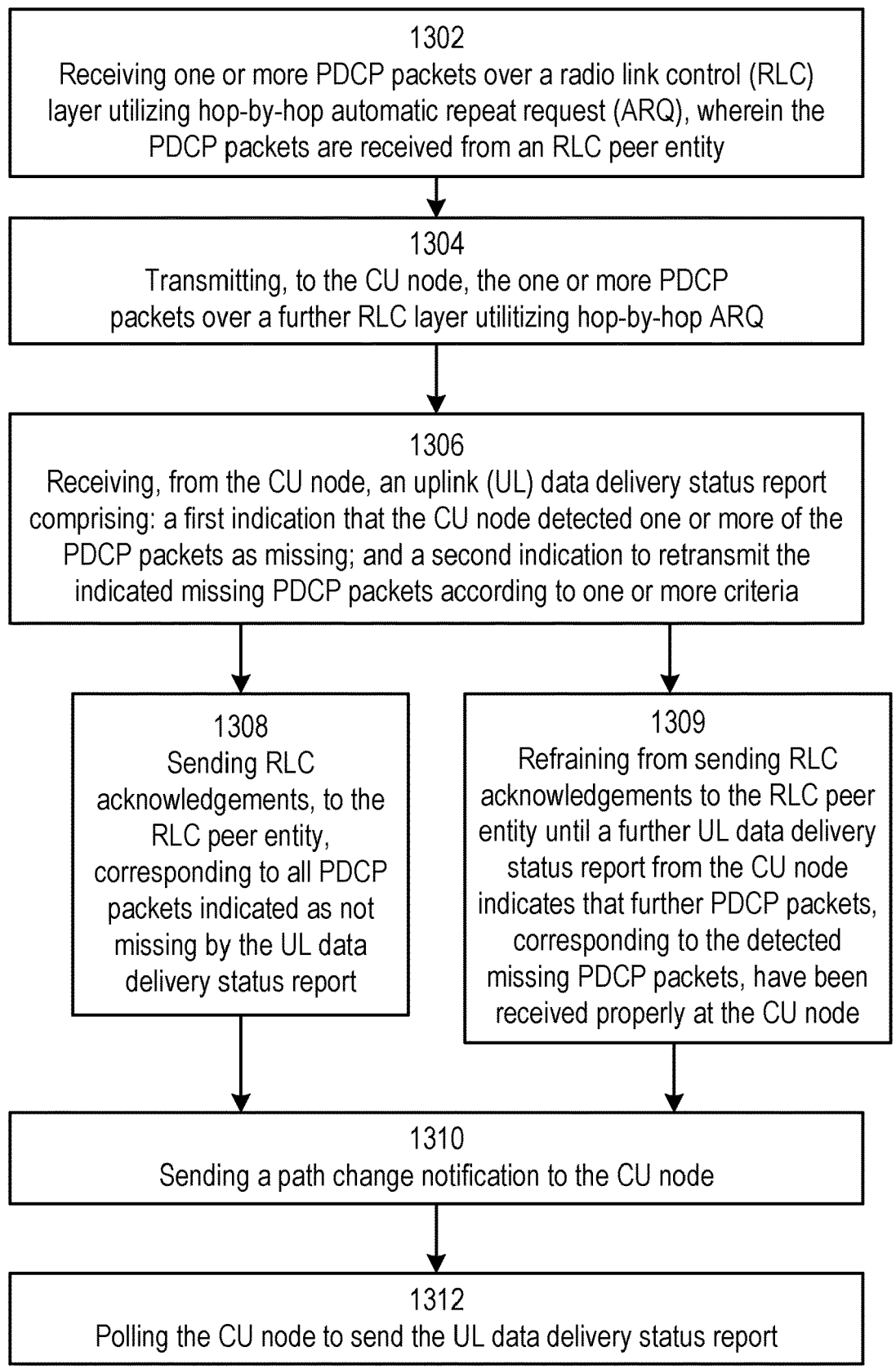
FIG. 13 is a flow chart illustrating a method in accordance with some embodiments.

FIG. 13 illustrates an exemplary method and/or procedure performed by an integrated access backhaul (IAB) node of a radio access network (RAN), the IAB node configured as an intermediate in communication), via a packet data convergence protocol (PDCP), between a base station centralized unit (CU) node and a user equipment (UE), in accordance with particular exemplary embodiments of the present disclosure. Although the exemplary method and/or procedure is illustrated in FIG. 13 by blocks in a particular order, this order is exemplary and the operations corresponding to the blocks can be performed in different orders, and can be combined and/or divided into blocks having different functionality than shown in FIG. 13. Furthermore, the exemplary method and/or procedure shown in FIG. 13 can be complimentary to other exemplary methods and/or procedures disclosed herein, such that they are capable of being used cooperatively to provide the benefits, advantages, and/or solutions to problems described hereinabove. For example, the exemplary method and/or procedure shown in FIG. 13 can be used with one or more of the exemplary methods and/or procedures shown in FIG. 12.

The exemplary method and/or procedure begins at block 1302, where the IAB node can receive one or more PDCP packets over a radio link control (RLC) layer utilizing hop-by-hop automatic repeat request (ARQ), wherein the PDCP packets are received from an RLC peer entity.

At block 1304, the IAB node can transmit, to the CU node, the one or more PDCP packets over a further RLC layer utilizing hop-by-hop automatic repeat request (ARQ).

In block 1306, the IAB node can receiving, from the CU node, an uplink (UL) data delivery status report comprising. The UL data delivery request can include: a first indication that the CU node detected one or more of the PDCP packets as missing; and a second indication to retransmit the indicated missing PDCP packets according to one or more criteria.

In some embodiments, in block 1308, the IAB node can send RLC acknowledgements, to the RLC peer entity, corresponding to all PDCP packets indicated as not missing by the UL data delivery status report.

In other embodiments, in block 1309, the IAB node can refrain from sending RLC acknowledgements to the RLC peer entity until a further UL data delivery status report from the CU node indicates that further PDCP packets, corresponding to the detected missing PDCP packets, have been received properly at the CU node.

In block 1310, the IAB node can send a path change notification to the CU node.

In block 1312, the IAB node can poll the CU node to send the UL data delivery status report.

Other variations of operations 1302-1312 are also possible according to exemplary embodiments.

Figure 14:
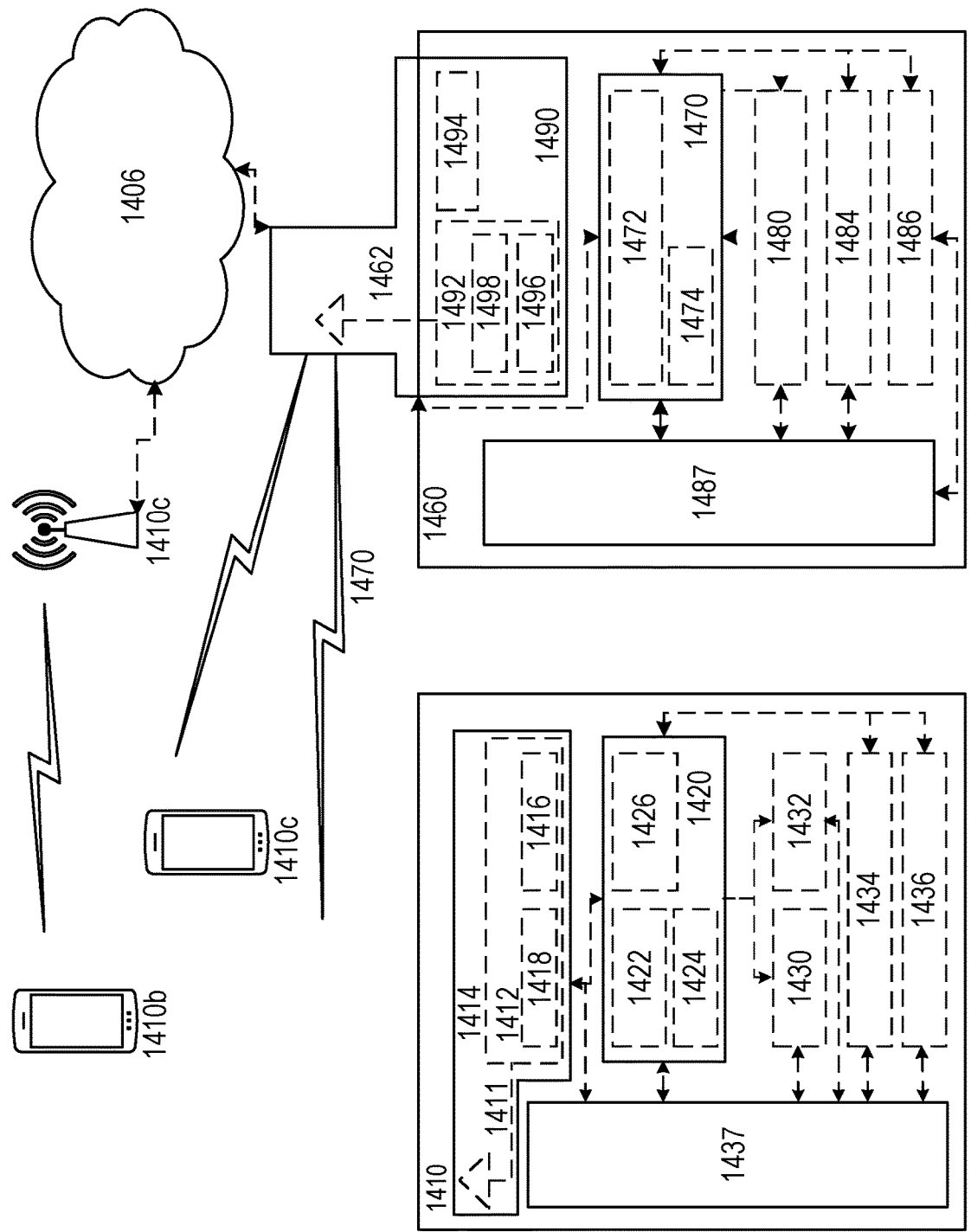
FIG. 14 illustrates a wireless network in accordance with some embodiments.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable medium 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 can execute instructions stored in device readable medium 1480 or in memory within processing circuitry 1470. Such functionality can include providing any of the various wireless features, functions, or benefits discussed herein. In some embodiments, processing circuitry 1470 can include a system on a chip (SOC).

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality can include providing any of the various wireless features or benefits discussed herein. For example, processing circuitry 1420 can execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410, and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network, and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of WD 1410.

Figure 15:
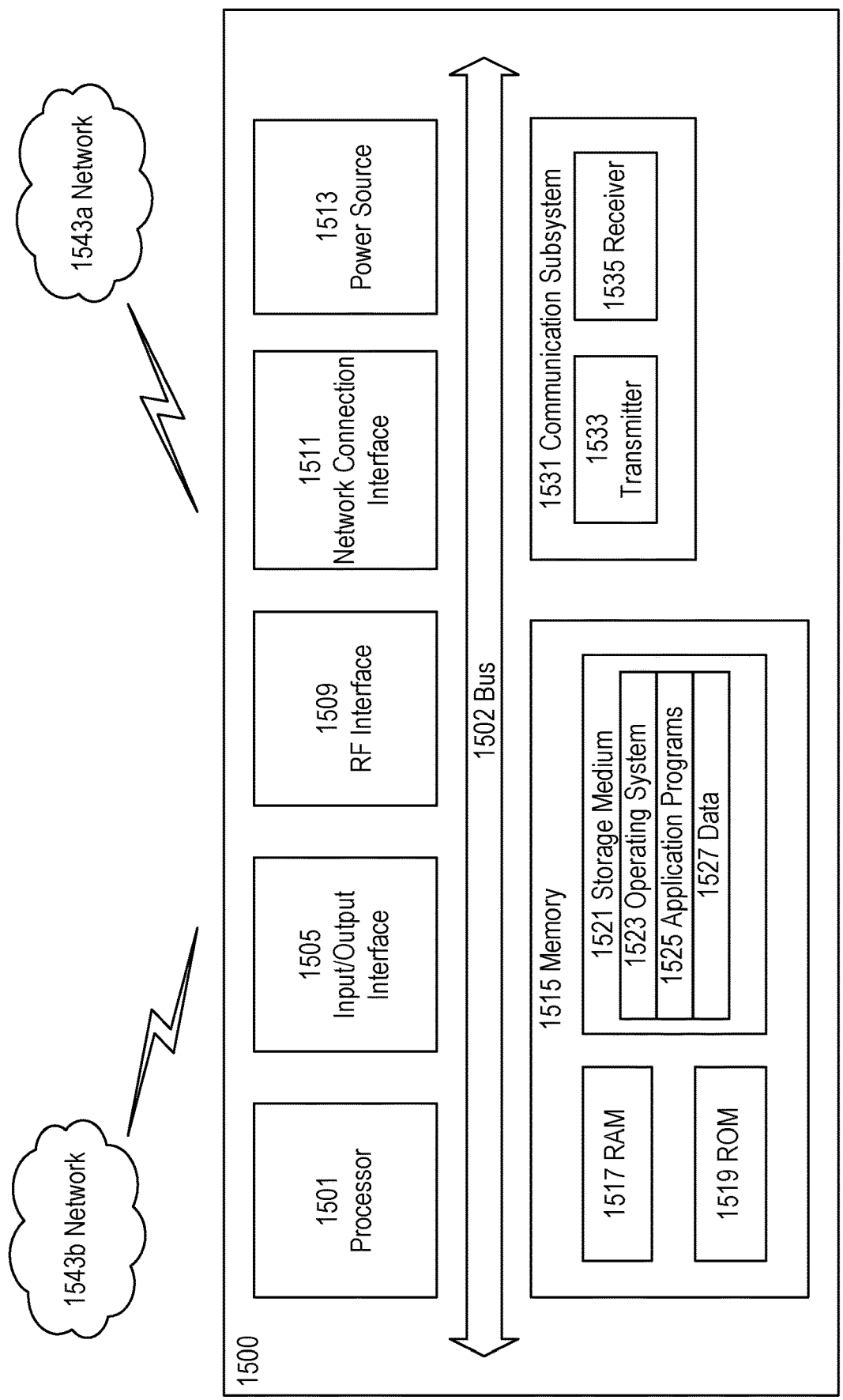
FIG. 15 illustrates a User Equipment in accordance with some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1500 can be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543*a*. Network 1543*a* can encompass wired and/or wireless networks such as a local-area network (LAN), a wide-area network (WAN), a computer network, a wireless network, a telecommunications network, another like network or any combination thereof. For example, network 1543*a* can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543b using communication subsystem 1531. Network 1543a and network 1543b can be the same network or networks or different network or networks. Communication subsystem 1531 can be configured to include one or more transceivers used to communicate with network 1543b. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543b can encompass wired and/or wireless networks such as a local-area network (LAN), a wide-area network (WAN), a computer network, a wireless network, a telecommunications network, another like network or any combination thereof. For example, network 1543b can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
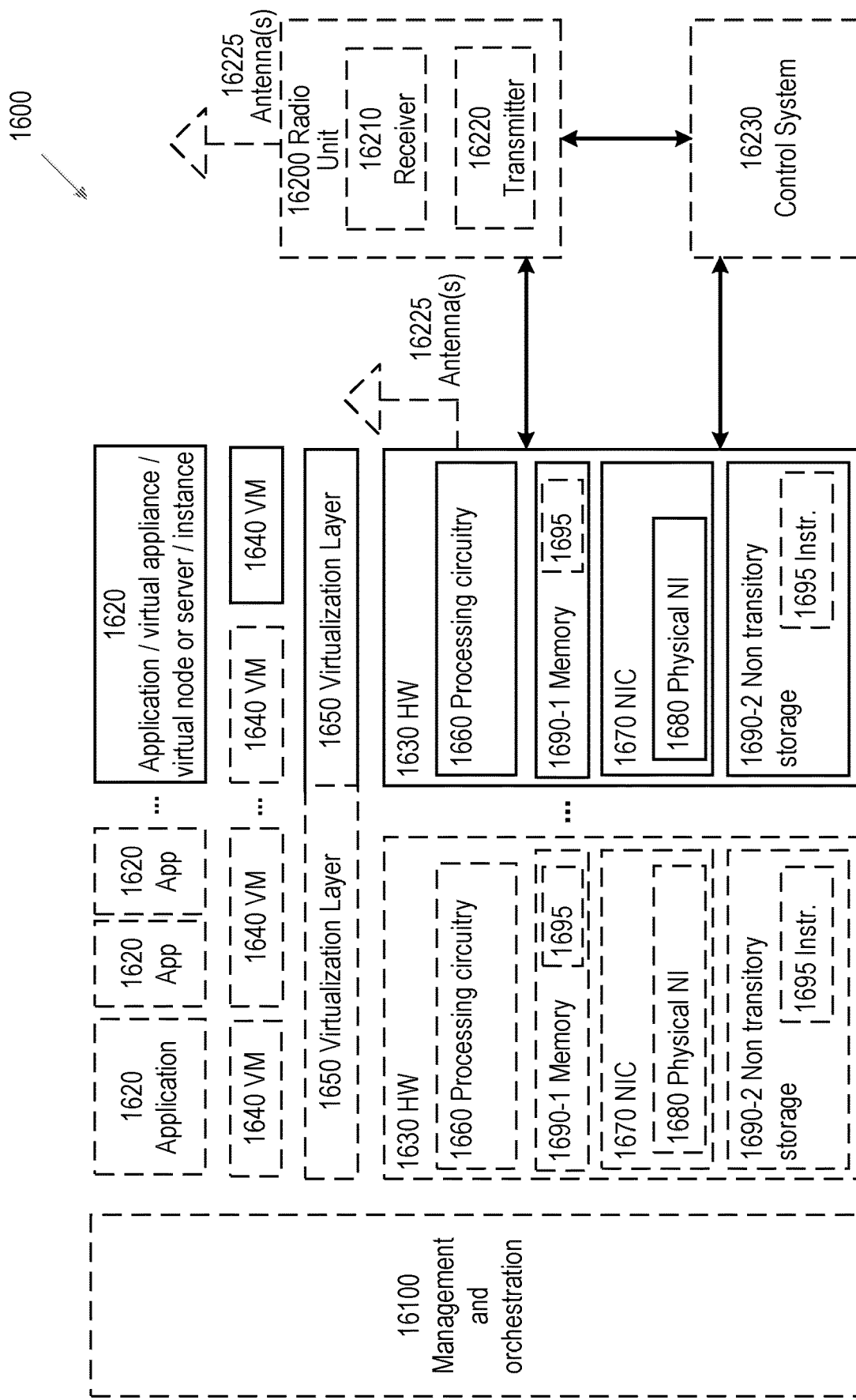
FIG. 16 illustrates a virtualization environment in accordance with some embodiments.

FIG. 16 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized. The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g., such as in a data center or customer premise equipment (CPE)) where many hardware nodes work together and are managed via management and orchestration (MANO) 16100, which, among others, oversees lifecycle management of applications 1620. Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station.

In some embodiments, some signalling can be effected with the use of control system 16230 which can alternatively be used for communication between the hardware nodes 1630 and radio units 16200.

Figure 17:
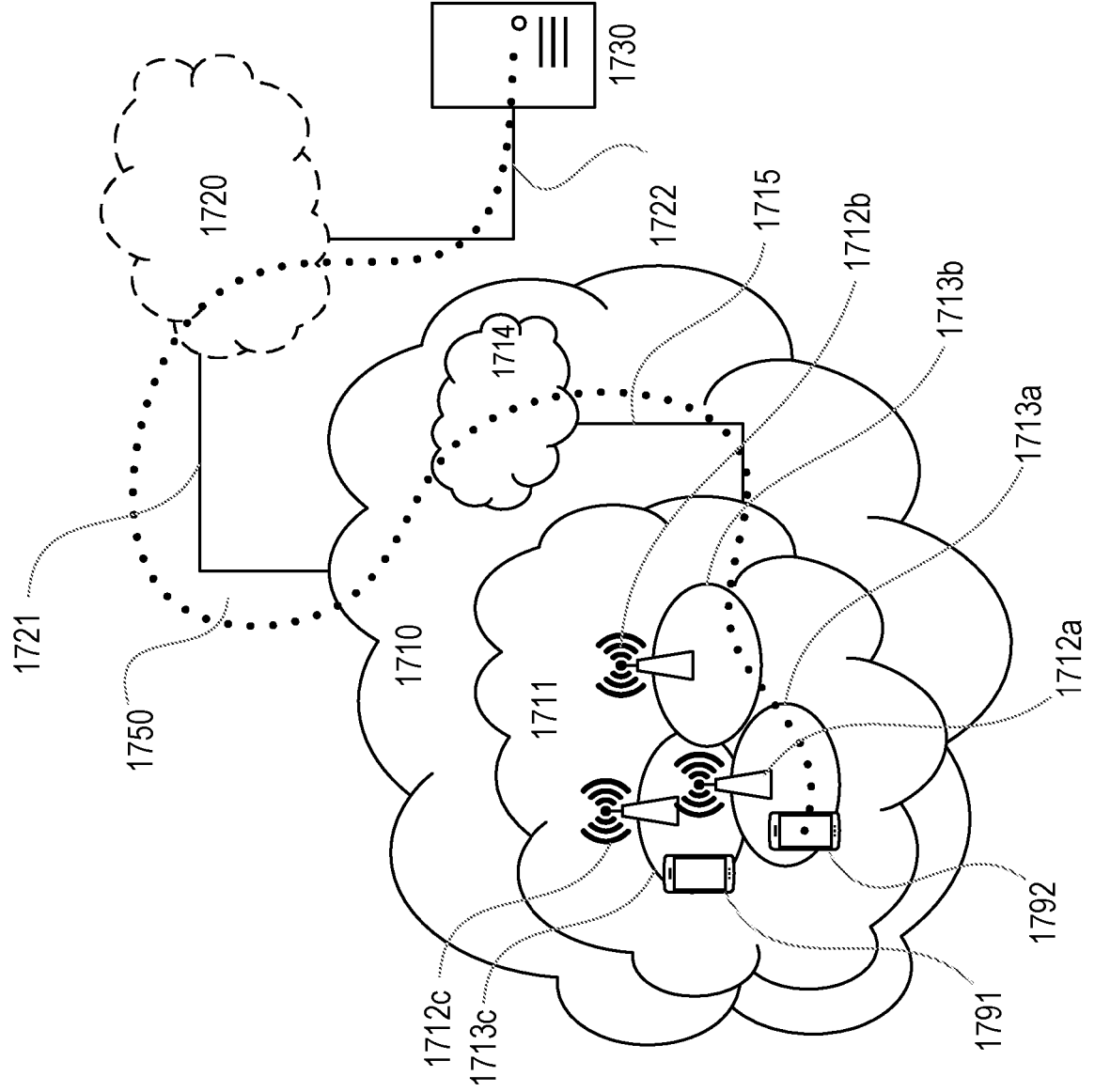
FIG. 17 illustrates a telecommunication network connected via an intermediate network to a host computer in accordance with some embodiments.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c can be configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which can be embodied in the hardware and/or software of a standalone server, a cloud-implemented server, a distributed server or as processing resources in a server farm. Host computer 1730 can be under the ownership or control of a service provider, or can be operated by the service provider or on behalf of the service provider. Connections 1721 and 1722 between telecommunication network 1710 and host computer 1730 can extend directly from core network 1714 to host computer 1730 or can go via an optional intermediate network 1720. Intermediate network 1720 can be one of, or a combination of more than one of, a public, private or hosted network; intermediate network 1720, if any, can be a backbone network or the Internet; in particular, intermediate network 1720 can comprise two or more sub-networks (not shown).

The communication system of FIG. 17 as a whole enables connectivity between the connected UEs 1791, 1792 and host computer 1730. The connectivity can be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 can be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which can have storage and/or processing capabilities. In particular, processing circuitry 1818 can comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 can be operable to provide a service to a remote user, such as UE 1830 connecting via OTT connection 1850 terminating at UE 1830 and host computer 1810. In providing the service to the remote user, host application 1812 can provide user data which is transmitted using OTT connection 1850.

Communication system 1800 can also include base station 1820 provided in a telecommunication system and comprising hardware 1825 enabling it to communicate with host computer 1810 and with UE 1830. Hardware 1825 can include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 can be configured to facilitate connection 1860 to host computer 1810. Connection 1860 can be direct or it can pass through a core network (not shown in FIG. 18) of the telecommunication system and/or through one or more intermediate networks outside the telecommunication system. In the embodiment shown, hardware 1825 of base station 1820 can also include processing circuitry 1828, which can comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 can also include UE 1830 already referred to. Its hardware 1835 can include radio interface 1837 configured to set up and maintain wireless connection 1870 with a base station serving a coverage area in which UE 1830 is currently located. Hardware 1835 of UE 1830 can also include processing circuitry 1838, which can comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 can be operable to provide a service to a human or non-human user via UE 1830, with the support of host computer 1810. In host computer 1810, an executing host application 1812 can communicate with the executing client application 1832 via OTT connection 1850 terminating at UE 1830 and host computer 1810. In providing the service to the user, client application 1832 can receive request data from host application 1812 and provide user data in response to the request data. OTT connection 1850 can transfer both the request data and the user data. Client application 1832 can interact with the user to generate the user data that it provides.

Figure 18:
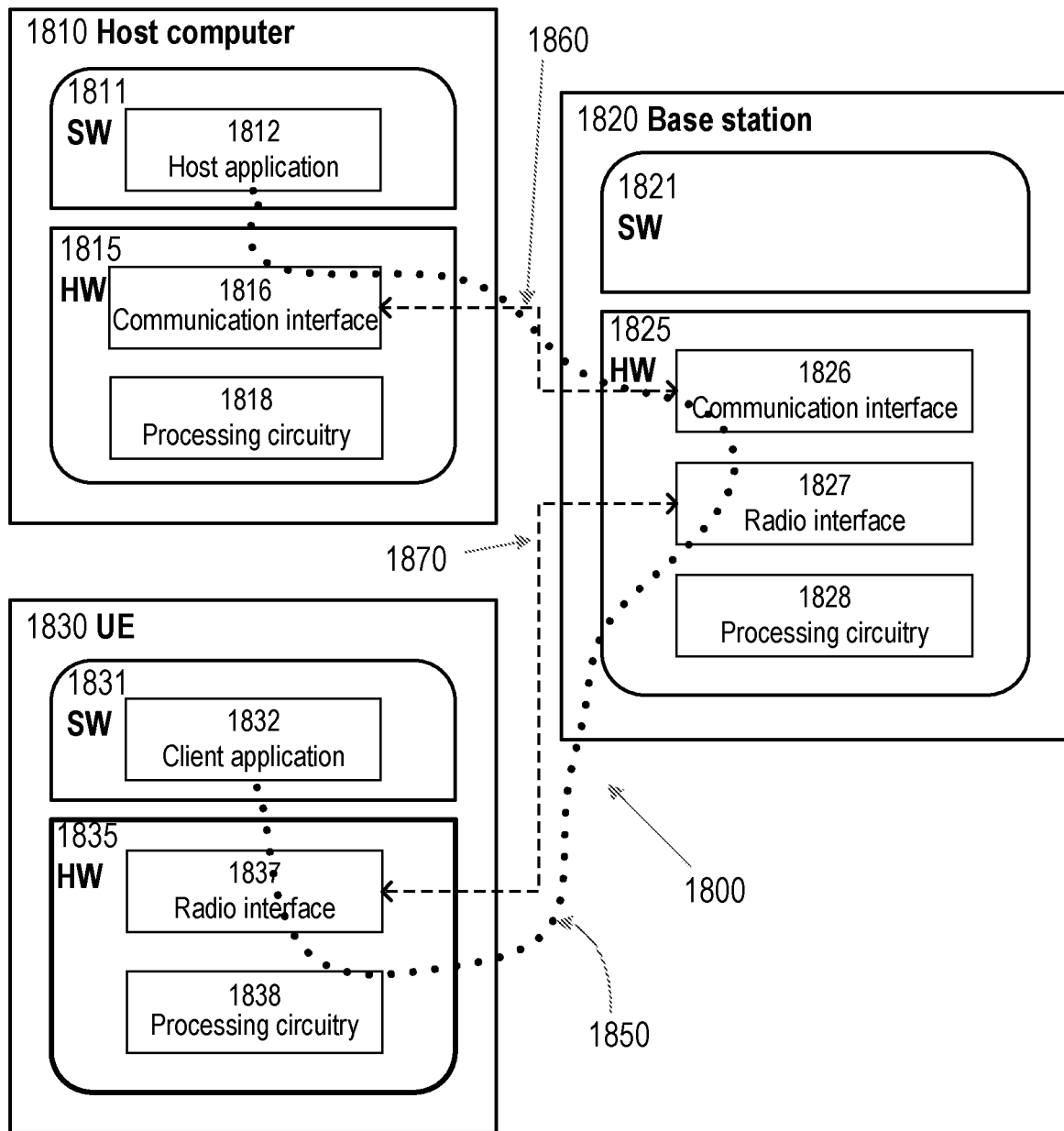
FIG. 18 illustrates a host computer communicating via a base station with a user equipment over a partially wireless connection in accordance with some embodiments.

It is noted that host computer 1810, base station 1820 and UE 1830 illustrated in FIG. 18 can be similar or identical to host computer 1730, one of base stations 1712*a*, 1712*b*, 1712*c* and one of UEs 1791, 1792 of FIG. 17, respectively. This is to say, the inner workings of these entities can be as shown in FIG. 18 and independently, the surrounding network topology can be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure can determine the routing, which it can be configured to hide from UE 1830 or from the service provider operating host computer 1810, or both. While OTT connection 1850 is active, the network infrastructure can further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1850 between host computer 1810 and UE 1830, in response to variations in the measurement results. The measurement procedure and/or the network functionality for reconfiguring OTT connection 1850 can be implemented in software 1811 and hardware 1815 of host computer 1810 or in software 1831 and hardware 1835 of UE 1830, or both. In embodiments, sensors (not shown) can be deployed in or in association with communication devices through which OTT connection 1850 passes; the sensors can participate in the measurement procedure by supplying values of the monitored quantities exemplified above, or supplying values of other physical quantities from which software 1811, 1831 can compute or estimate the monitored quantities. The reconfiguring of OTT connection 1850 can include message format, retransmission settings, preferred routing etc.; the reconfiguring need not affect base station 1820, and it can be unknown or imperceptible to base station 1820. Such procedures and functionalities can be known and practiced in the art. In certain embodiments, measurements can involve proprietary UE signaling facilitating host computer 1810's measurements of throughput, propagation times, latency and the like. The measurements can be implemented in that software 1811 and 1831 causes messages to be transmitted, in particular empty or 'dummy' messages, using OTT connection 1850 while it monitors propagation times, errors etc.

Figure 19:
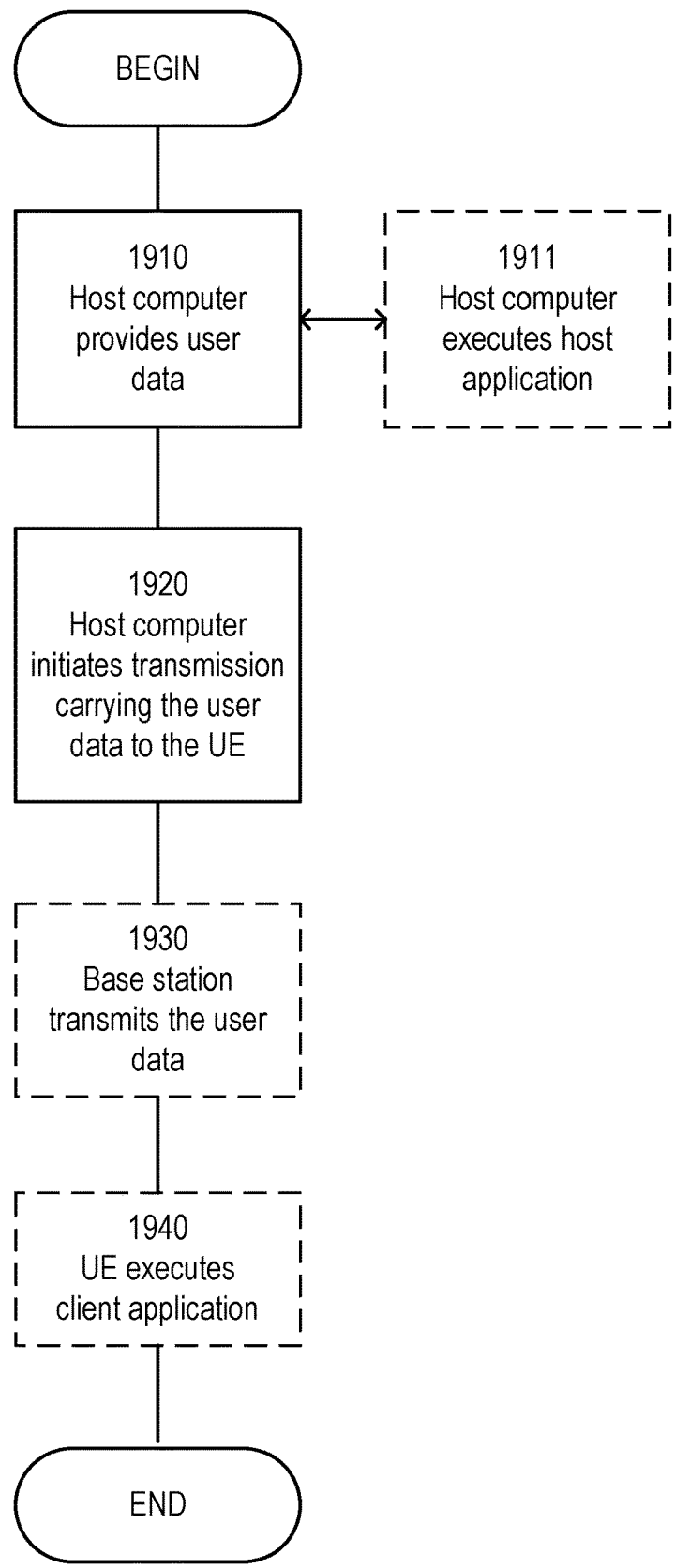
FIG. 19 is a flow chart illustrating a method implemented in a communication system including a host computer, a base station and a user equipment in accordance with some embodiments.

FIG. 19 is a flowchart illustrating an exemplary method and/or procedure implemented in a communication system, in accordance with one embodiment. The communication system includes a host computer, a base station and a UE which, in some exemplary embodiments, can be those described with reference to FIGS. 17 and 18. For simplicity of the present disclosure, only drawing references to FIG. 19 will be included in this section. In step 1910, the host computer provides user data. In substep 1911 (which can be optional) of step 1910, the host computer provides the user data by executing a host application. In step 1920, the host computer initiates a transmission carrying the user data to the UE. In step 1930 (which can be optional), the base station transmits to the UE the user data which was carried in the transmission that the host computer initiated, in accordance with the teachings of the embodiments described throughout this disclosure. In step 1940 (which can also be optional), the UE executes a client application associated with the host application executed by the host computer.

Figure 20:
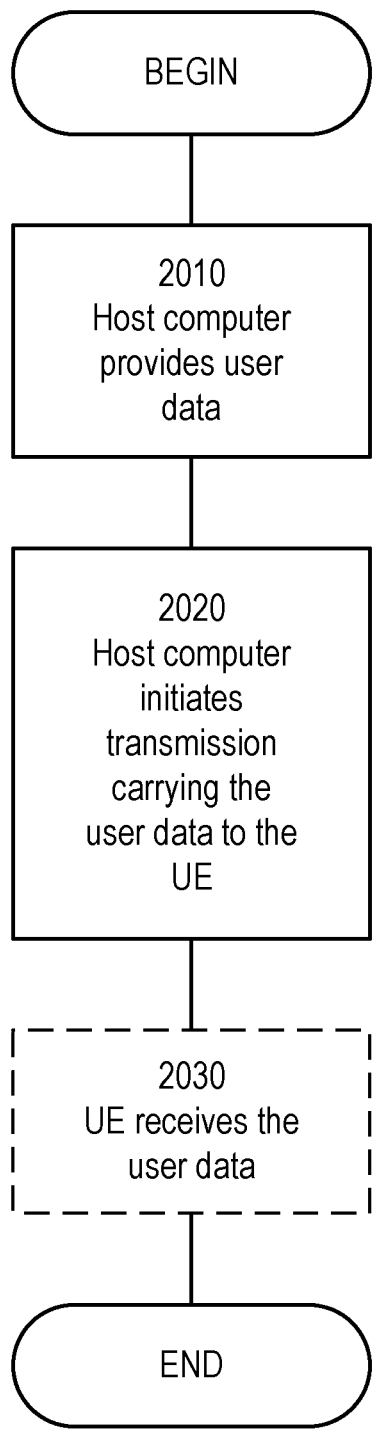
FIG. 20 is a flow chart illustrating a method implemented in a communication system including a host computer, a base station and a user equipment in accordance with some embodiments.

FIG. 20 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission can pass via the base station, in accordance with the teachings of the embodiments described throughout this disclosure. In step 2030 (which can be optional), the UE receives the user data carried in the transmission.

Figure 21:
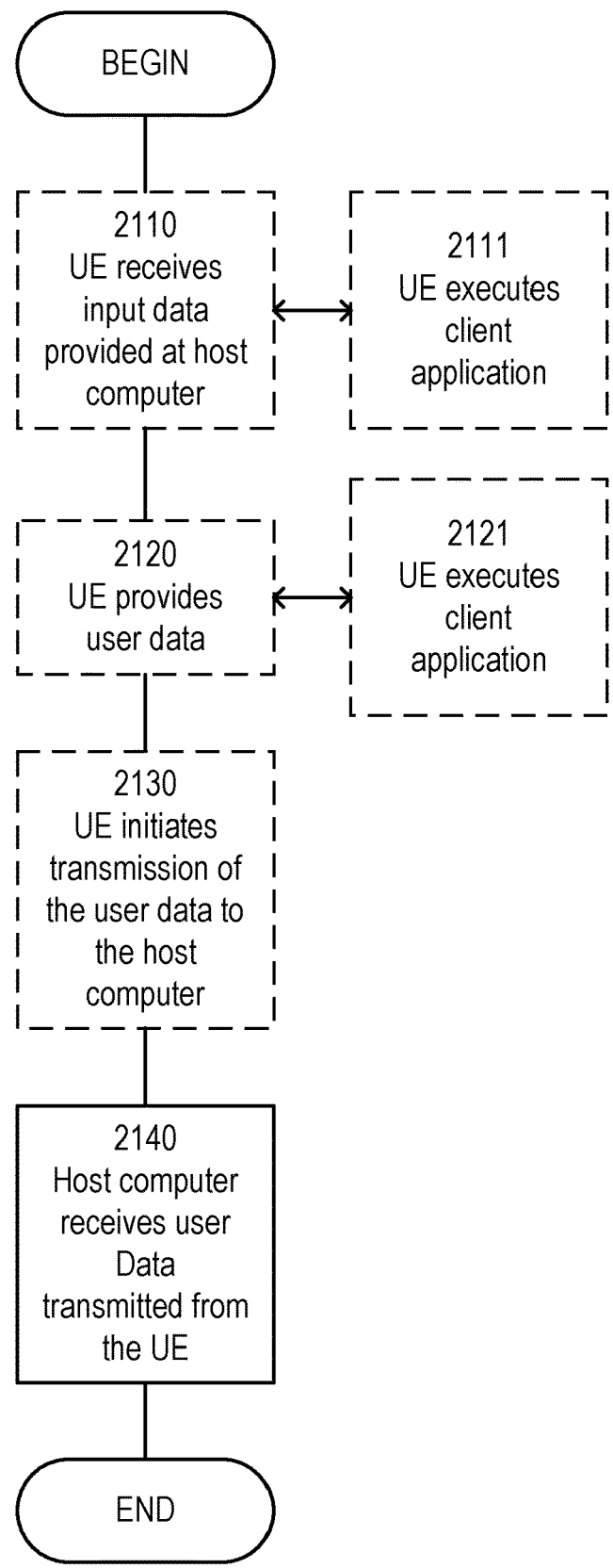
FIG. 21 is a flow chart illustrating a method implemented in a communication system including a host computer, a base station and a user equipment in accordance with some embodiments.

FIG. 21 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 21 will be included in this section. In step 2110 (which can be optional), the UE receives input data provided by the host computer. Additionally or alternatively, in step 2120, the UE provides user data. In substep 2121 (which can be optional) of step 2120, the UE provides the user data by executing a client application. In substep 2111 (which can be optional) of step 2110, the UE executes a client application which provides the user data in reaction to the received input data provided by the host computer. In providing the user data, the executed client application can further consider user input received from the user. Regardless of the specific manner in which the user data was provided, the UE initiates, in substep 2130 (which can be optional), transmission of the user data to the host computer. In step 2140 of the method, the host computer receives the user data transmitted from the UE, in accordance with the teachings of the embodiments described throughout this disclosure.

Figure 22:
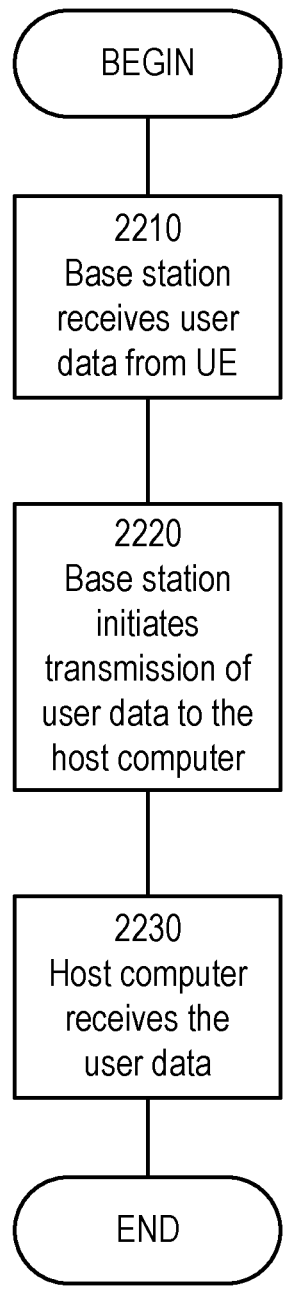
FIG. 22 is a flow chart illustrating a method implemented in a communication system including a host computer, a base station and a user equipment in accordance with some embodiments.

FIG. 22 is a flowchart illustrating an exemplary method and/or procedure implemented in a communication system, in accordance with one embodiment. The communication system includes a host computer, a base station and a UE which can be those described with reference to FIGS. 17 and 18. For simplicity of the present disclosure, only drawing references to FIG. 22 will be included in this section. In step 2210 (which can be optional), in accordance with the teachings of the embodiments described throughout this disclosure, the base station receives user data from the UE. In step 2220 (which can be optional), the base station initiates transmission of the received user data to the host computer. In step 2230 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

REFERENCES

3GPP Technical Specification (TS) 38.401.
3GPP TS 23.501.
3GPP TS 38.874.
3GPP TS 29.281.
3GPP Technical Report (TR) 38.801.

Abbreviations

At least some of the following abbreviations can be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CSI-RS CSI Reference Signal
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Packet Data Protocol
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol (or Signal) Received Power
RSRQ Reference Symbol (or Signal) Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSB Synchronization Signal Block
SSS Secondary Synchronization Signal
TDD Time Division Duplex
TDOA Time Difference of Arrival
TOA Time of Arrival
TSS Tertiary Synchronization Signal
TTI Transmission Time Interval
TTT Time-to-Trigger
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
CM Cubic Metric
MIMO Multiple-input-multiple-output
MRC Maximum-ratio combining
MRT Maximum-ratio transmission
OCC Orthogonal Cover Code
PAPR Peak to Average Power Ratio
SRS Sounding Reference Signal
SPS Semi-Persistent Scheduling
URLLC Ultra-Reliable Low Latency Communication
VL-MIMO Very-large multiple-input-multiple-output
ZF Zero Forcing

The invention claimed is:

1. A method performed by a base station centralized unit (CU) node in communication, using a packet data convergence protocol (PDCP), with a user equipment (UE) via one or more intermediate integrated access backhaul (IAB) nodes of a radio access network (RAN), the method comprising:
receiving one or more PDCP packets over a radio link control (RLC) layer utilizing hop-by-hop automatic repeat request (ARQ) at each intermediate IAB node; and
in response to a trigger, sending, to at least one of the intermediate IAB nodes, an uplink, (UL) data delivery status report, the trigger comprising
receiving a message from an IAB node;
detecting that one or more further PDCP packets, that were expected to be received with the plurality of PDCP packets, are missing;
the uplink (UL) data delivery status report indicating the one or more further PDCP packets detected as missing; and
detecting that the number of missing PDCP packets, including the one or more further PDCP packets, exceeds a predetermined threshold.

2. The method of claim 1, wherein the UL data delivery status report comprises a flag instructing the IAB node to retransmit the further PDCP packets that are indicated as missing.

3. The method of claim 1, wherein the trigger comprises detecting a path change involving at least one of the intermediate IAB nodes.

4. The method of claim 1, wherein the trigger comprises receiving a predetermined amount of data.

5. The method of claim 1, comprising sending UL data delivery status reports periodically.

6. The method of claim 1, further comprising configuring the UE to delay declaration of a radio link failure (RLF) when connected to the RAN via one or more intermediate IAB nodes, relative to when connected to the RAN without intermediate IAB nodes.

7. The method of claim 6, wherein the amount of delay configured is proportional to the number of intermediate IAB nodes.

8. A method performed by an integrated access backhaul, (IAB) node of a radio access network (RAN), the IAB node configured as an intermediate in communication, via a packet data convergence protocol (PDCP), between a base station centralized unit (CU) node and a user equipment (UE), the method comprising:
   receiving one or more PDCP packets over a radio link control (RLC) layer utilizing hop-by-hop automatic repeat request, (ARQ), wherein the PDCP packets are received from an RLC peer entity;
   transmitting, to the CU node, the one or more PDCP packets over a further RLC layer utilizing hop-by-hop ARQ;
   receiving, from the CU node, an uplink (UL) data delivery status report;
   polling the CU node to send the UL data delivery status report; and
   refraining from sending RLC acknowledgements to the RLC peer entity until a further UL data delivery status report from the CU node indicates that further PDCP packets, corresponding to the detected missing PDCP packets, have been received properly at the CU node.

9. The method of claim 8, wherein the UL data delivery status report comprises:
   an indication that the CU node detected one or more of the PDCP packets as missing.

10. The method of claim 8, wherein the UL data delivery status report comprises:
    an indication to retransmit the indicated missing PDCP packets according to one or more criteria.

11. The method of claim 8, further comprising sending a path change notification to the CU node.

12. The method of claim 8, further comprising sending RLC acknowledgements, to the RLC peer entity, corresponding to all PDCP packets indicated as not missing by the UL data delivery status report.

13. A base station centralized unit (CU), node configurable for operation in a radio access network (RAN), that also comprises one or more integrated access backhaul (IAB) nodes, the CU node comprising:
    processing circuitry configured to:
       receive one or more PDCP packets over a Radio Link Control (RLC) layer utilizing hop-by-hop Automatic Repeat Request (ARQ) at each intermediate IAB node; and
       in response to a trigger, send, to at least one of the intermediate IAB nodes, an Uplink (UL) data delivery status report, wherein the trigger comprises the processing circuitry being further configured to:
          receive a message from an IAB node;
          detect that one or more further PDCP packets, that were expected to be received with the plurality of PDCP packets, are missing;
          indicate the one or more further PDCP packets detected as missing in the uplink (UL) data delivery status report; and
          detect that the number of missing PDCP packets, including the one or more further PDCP packets, exceeds a predetermined threshold; and
    power supply circuitry configured to supply power to the CU node.

14. An integrated access backhaul (IAB) node configurable for operation in a radio access network (RAN) that also comprises a base station centralized unit (CU) node, the IAB node comprising:
    processing circuitry configured to:
       receive one or more PDCP packets over a Radio Link Control, RLC, layer utilizing hop-by-hop Automatic Repeat Request, ARQ, wherein the PDCP packets are arranged to be received from an RLC peer entity;
       transmit, to the CU node, the one or more PDCP packets over a further RLC layer utilizing hop-by-hop ARQ;
       receive, from the CU node, an UL data delivery status report;
       poll the CU node to send the Uplink, UL, data delivery status report; and
       refrain from sending RLC acknowledgements to the RLC peer entity until a further UL data delivery status report from the CU node indicates that further PDCP packets, corresponding to the detected missing PDCP packets, have been received properly at the CU node; and
    power supply circuitry configured to supply power to the IAB node.

* * * * *